(12) United States Patent
Niamut et al.

(10) Patent No.: US 11,184,641 B2
(45) Date of Patent: Nov. 23, 2021

(54) CODING SPHERICAL VIDEO DATA

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Omar Aziz Niamut, Vlaardingen (NL); Emmanuel Thomas, Delft (NL)

(73) Assignees: KONINKLIJKE KPN N.V., Rotterdam (NL); NEDERLANDSE ORGANISATIE VOOR TOEGEPAST- NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 16/611,419

(22) PCT Filed: May 8, 2018

(86) PCT No.: PCT/EP2018/061817
§ 371 (c)(1),
(2) Date: Nov. 6, 2019

(87) PCT Pub. No.: WO2018/206551
PCT Pub. Date: Nov. 15, 2018

(65) Prior Publication Data
US 2020/0177916 A1 Jun. 4, 2020

(30) Foreign Application Priority Data
May 9, 2017 (EP) .................................... 17170049

(51) Int. Cl.
*H04N 19/597* (2014.01)
*H04N 19/147* (2014.01)
(Continued)

(52) U.S. Cl.
CPC .......... *H04N 19/597* (2014.11); *A01C 3/023* (2013.01); *H04N 19/147* (2014.11);
(Continued)

(58) Field of Classification Search
CPC .. H04N 19/117; H04N 19/147; H04N 19/154; H04N 19/167; H04N 19/174; H04N 19/182; H04N 19/46; H04N 19/597
See application file for complete search history.

(56) References Cited

U.S. PATENT DOCUMENTS

| | | | |
|---|---|---|---|
| 2007/0223588 A1* | 9/2007 | Lee ........................ | H04N 19/56 375/240.16 |
| 2008/0031505 A1* | 2/2008 | Barski ................... | G16H 30/40 382/132 |

(Continued)

OTHER PUBLICATIONS

Byeongdoo Choi et al., "Text of ISO/IEC DIS 23090-2 Omnidirectional Media Format" 2017, 118 MPEG Meeting Hobert AU Apr. 6, 2017.docx STD Version 2.2; equivalent to Deshpande (Sharp) S et al: "Text of ISO/IEC 23000-20 CD Omnidirectional Media Application Format", 118 MPEG Meeting Hobart AU, Apr. 6, 2017.

(Continued)

*Primary Examiner* — Joon Kwon
(74) *Attorney, Agent, or Firm* — McDonnell Boehnen Hulbert & Berghoff LLP

(57) ABSTRACT

A method is described of forming a bitstream by an encoder apparatus comprising: a processor of the encoder apparatus receiving a projected video frame including one or more pixel regions, the one or more pixel regions representing pixels of spherical video data projected onto one or more 2D projection surfaces of a projection model, the projection model being adapted to project spherical video data onto a rectangular 2D surface of a video frame; the processor generating a plurality of different candidate video frames on the basis of the received projected video frame, each can- (Continued)

didate video frame being formed by applying at least one operation to one or more groups of pixels in one or more pixel regions of the projected video frame, wherein said at least operation includes a shift, mirror and/or rotation operation; and, wherein said operation is different for each of said plurality of different candidate video frames; the processor applying a rate distortion analysis to each of the candidate video frames to determine a rate distortion cost for each of the candidate video frames; and, the processor selecting a candidate video frame from said plurality of candidate video frames on the basis of the rate distortion cost; and, generating an output bitstream on the basis of the selected candidate video frame.

20 Claims, 17 Drawing Sheets

(51) Int. Cl.
| | | |
|---|---|---|
| *H04N 19/167* | (2014.01) | |
| *H04N 19/182* | (2014.01) | |
| *H04N 19/46* | (2014.01) | |
| *A01C 3/02* | (2006.01) | |

(52) U.S. Cl.
CPC ......... *H04N 19/167* (2014.11); *H04N 19/182* (2014.11); *H04N 19/46* (2014.11)

(56) References Cited

U.S. PATENT DOCUMENTS

| | | | | |
|---|---|---|---|---|
| 2016/0112489 A1* | 4/2016 | Adams | ................. | H04L 65/605 |
| | | | | 375/240.01 |
| 2016/0112704 A1* | 4/2016 | Grange | ................. | H04N 19/61 |
| | | | | 375/240.12 |
| 2017/0124398 A1* | 5/2017 | Birkbeck | ............... | G06K 9/224 |
| 2018/0018761 A1* | 1/2018 | Tanaka | .................... | G06T 5/006 |
| 2018/0084257 A1* | 3/2018 | Abbas | ................. | H04N 19/147 |
| 2018/0124312 A1* | 5/2018 | Chang | ................... | H04N 19/46 |
| 2018/0184121 A1* | 6/2018 | Kim | ..................... | H04N 19/547 |
| 2019/0045212 A1* | 2/2019 | Rose | ...................... | H04N 19/59 |
| 2019/0045213 A1* | 2/2019 | Raut | .................... | H04N 19/172 |
| 2019/0281293 A1* | 9/2019 | Lin | ........................ | H04N 19/14 |

OTHER PUBLICATIONS

European Search Report, European Patent Application No. 17170049. 5, dated Feb. 8, 2018, 15 pages.

PCT International Search Report and Written Opinion, PCT International Application No. PCT/EP2018/061817, dated Sep. 21, 2018, 21 pages.

Choi, Byeongdoo et al., "Text of ISO/IEC 23000-20 CD Omnidirectional Media Application Format", International Organisation for Standardisation, Organisation Internationale De Normalisation, ISO/IEC JTC1/SC29/WG11, Coding of Moving Pictures and Audio, Jan. 2017, 49 pages.

Hannuksela, Miska M., et al., "OMAF PACK-VE: Rectangular Region-Wise Packing for ISOBMFF", International Organisation for Standardisation, Organisation Internationale De Normalisation, ISO/IEC JTC1/SC29/WG11, Coding of Moving Pictures and Audio, Jan. 2017, 4 pages.

Hannuksela, Miska M. et al., "Virtual Reality Video Metadata in ISO Base Media File Format", International Organisation for Standardisation, Organisation Internationale De Normalisation, ISO/IEC JTC1/SC29/WG11, Coding of Moving Pictures and Audio, Oct. 2016, 8 pages.

Woo, Jihwan et al., "OMAF Pack-CE: Generalized Region-Wise Packing", International Organisation for Standardisation, Organisation Internationale De Normalisation, ISO/IEC JTC1/SC29/WG11, Coding of Moving Pictures and Audio, Apr. 2017, 13 pages.

Kammachi-Sreedhar, K. et al., "OMAF PROJ-VE/PACK-VE: Test Results fro Viewport-Dependent Pyramid, Cube Map, and Equirectangular Panorama Schemes", International Organisation for Standardisation, Organisation Internationale De Normalisation, ISO/IEC JTC1/SC29/WG11, Coding of Moving Pictures and Audio, Jan. 2017, 9 pages.

Lai, PoLin et al., "CICP VR Projection and Packing Indicator", International Organisation for Standardisation, Organisation Internationale De Normalisation, ISO/IEC JTC1/SC29/WG11, Coding of Moving Pictures and Audio, Oct. 2016, 6 pages.

* cited by examiner

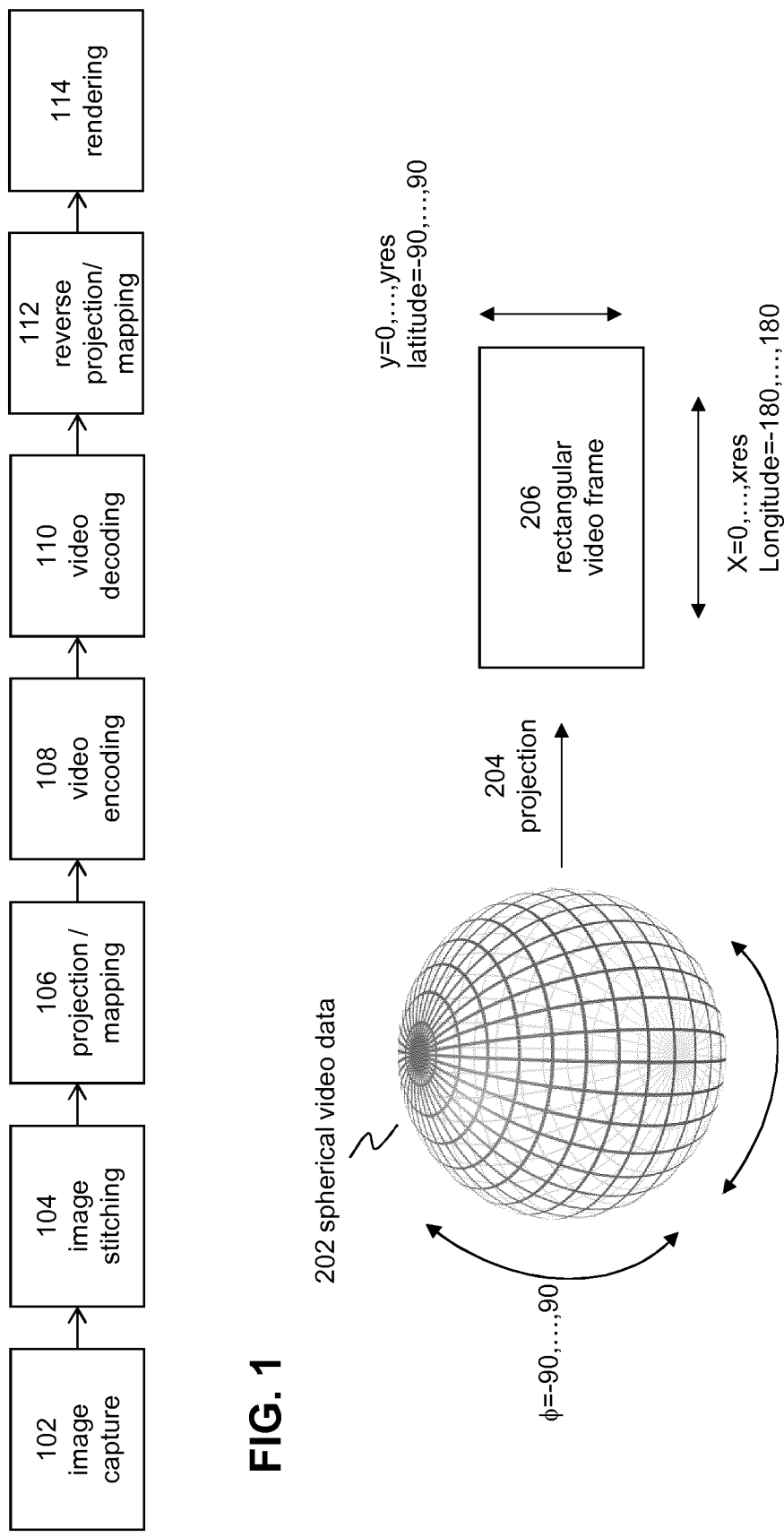

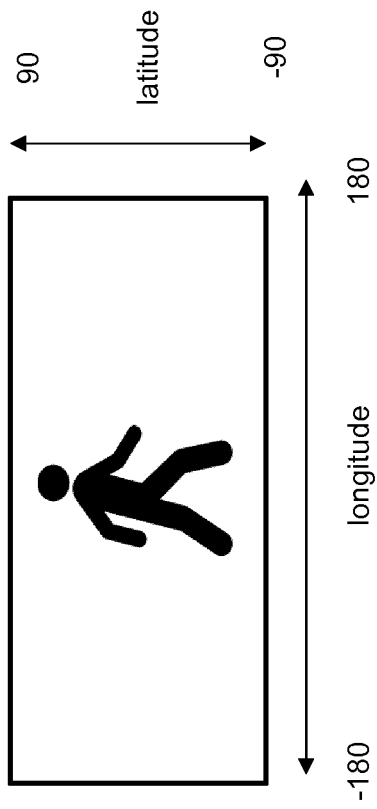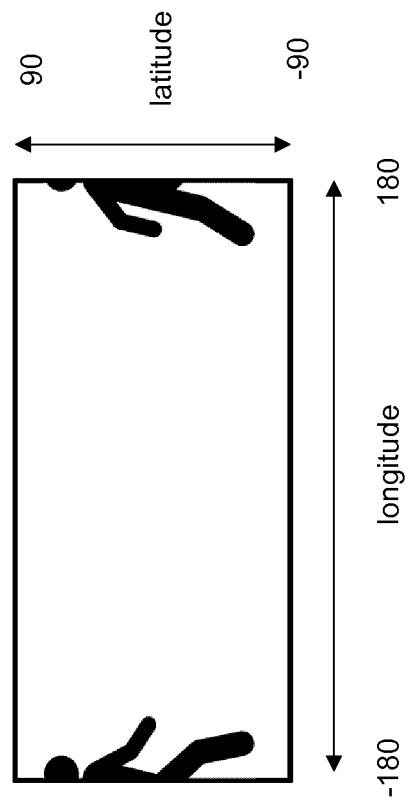
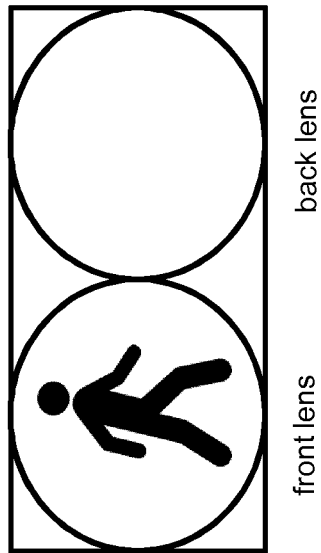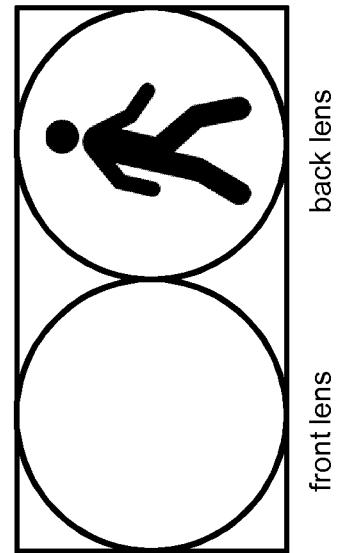
FIG. 5A
FIG. 5B

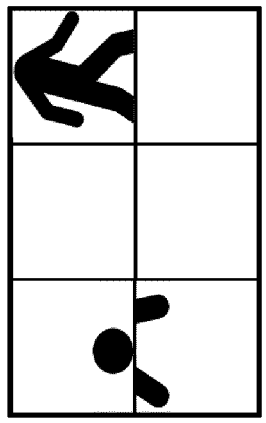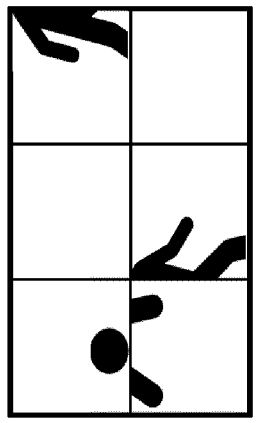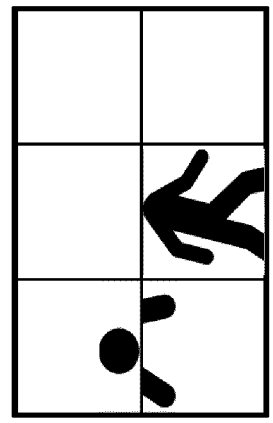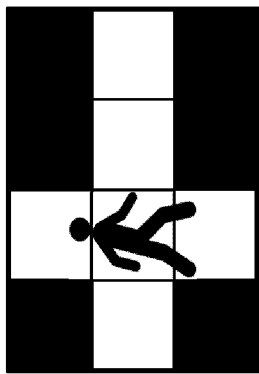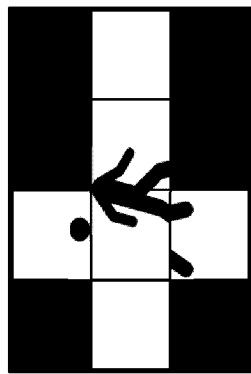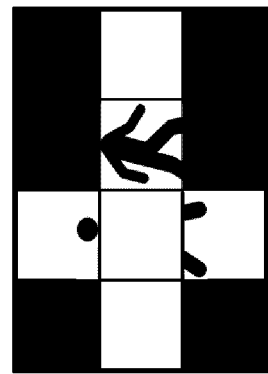
FIG. 6A  FIG. 6B  FIG. 6C

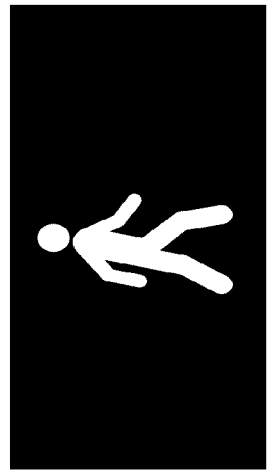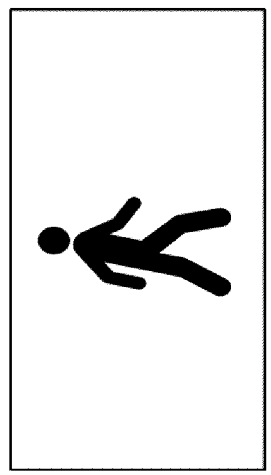
FIG. 15A
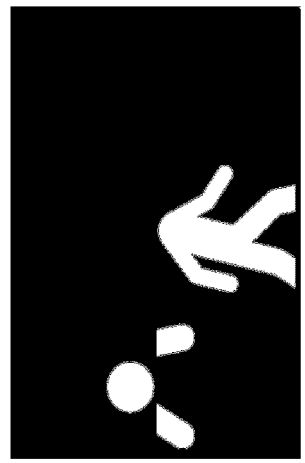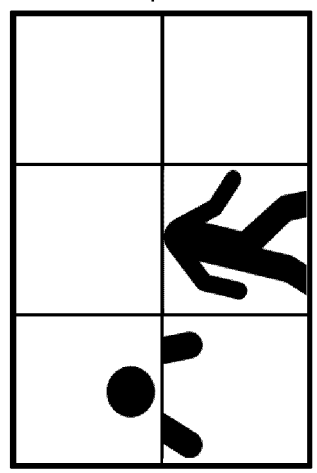
FIG. 15B

CODING SPHERICAL VIDEO DATA

CROSS REFERENCE TO RELATED APPLICATIONS

The present application is a national stage entry of, and claims priority to, PCT/EP2018/061817, filed on May 8, 2018, which claims priority to European Patent Application EP 17170049.5, filed in the European Patent Office on May 9, 2017, both of which are hereby incorporated in their entirety herein by reference.

FIELD OF THE INVENTION

The invention relates to coding spherical video data, and, in particular, though not exclusively, to methods and systems for decoding and encoding spherical video data, a decoder apparatus for decoding encoded spherical video data and an encoder apparatus for encoding spherical video data and a computer program product for executing such methods.

BACKGROUND OF THE INVENTION

Currently an increasingly number of professional and consumer-grade cameras are able to produce 360-degree, also called omnidirectional, video content. This content, which can be regarded as pixels arranged on a spherical surface (sometimes also referred to as a pixel sphere or a sphere of pixels), is hereafter referred to in short by the term spherical content. The delivery of spherical content usually requires a higher bandwidth than conventional videos. Spherical content represents a wider field of view than conventional videos and thus contains more information from the original scene than conventional video.

Typically, however only a portion of the spherical content is displayed to the user. This portion is usually referred to as a viewport, which is characterised by the so-called Field of View (FoV), i.e. the (vertical, horizontal or diagonal) angular extent of a given visual scene that is displayed to the user. The viewpoint depends on the direction the user is watching. Pixels arranged on a spherical surface however cannot be handled directly by current video coding standards, which are configured to process standardized video data formats referred to as video frames, i.e. rectangular arrangements of pixels, also referred to as a picture. For that reason, spherical content is processed before it is fed to the input of an encoding device.

A typical processing chain for spherical video content may include capturing of panoramic images with a panoramic or 360-degree image capturing systems. The capturing of 360-video typically includes multiple image sensors (e.g. CMOS or CCD censors) capturing video in different directions and then stitching separate images from the individual image sensors together in an image stitching operation into spherical video data. Thereafter, the spherical video data are projected onto a 2D rectangular surface using a suitable projection model. This way, 2D rectangular image frames or pictures comprising projected spherical image data are formed which can be encoded by an encoding apparatus (an encoder). The encoded spherical video data may be provided to (e.g. transmitted to) media playback devices, decoded using a decoder apparatus and rendered using a rendering engine that is implemented in a media playback device that is suitable for rendering spherical content, e.g. Head Mounted Displays (HMDs) or on other displays. The media playback devices are configured to decode and render the encoded spherical video data, usually based on sensor information measuring user movements (e.g. viewpoint direction), or based on other user input (e.g. joystick, keyboard, touchscreen).

The formation of 2D rectangular image frames or pictures on the basis of spherical video data may typically include a projection of the spherical video data onto the surfaces ('faces') of a geometrical object (an object having straight edges) and subsequent mapping of the projected surfaces onto a rectangular (2D) shape. For encoding spherical video content, a 2D rectangular video frame is the most convenient form for use as input to the encoder, as it does not require modifications to existing encoding systems. Different projection models, such as an equirectangular projection (ERP), cube or pyramid projection model are known. In case of ERP a sphere is projected onto a rectangle (a single face) using the polar angles as the horizontal and vertical coordinates. In this case, the mapping is incorporated in the projection step as the EPR projection directly results into a rectangular 2D shape. Both the equirectangular and other projection formats can be directly encoded using existing encoding schemes, such as H.264/AVC and HEVC, as well as VP9 and AV1.

The state-of-the art video coding standard considers a video frame or a picture as a finite window of the captured signal. Further, it considers that pixels spatially close in the video frame or picture are also spatially close in the captured signal. But both assumptions are incorrect when dealing with spherical video data. The process of projecting spherical video data onto a 2D rectangular surface results in an arrangement of one or more so-called pixel regions in the video frame or picture. Different pixel regions in the video frame or picture define different groups of pixels belonging to different projection faces of the projection model (e.g. a cubic projection model) that is used in order to project the spherical video onto a rectangular plane. The edges of the pixel regions form boundaries, i.e. artificial boundaries, that are a direct consequence of the projection operation. These boundaries may be referred to as region boundaries or projection boundaries. The equirectangular projection model has only one single 2D surface. Thus spherical video data is projected onto one 2D surface, whereby the single 2D surface is mapped to one pixel region of a 2D rectangular shape.

The region boundaries thus form artificial discontinuities in the resulting video frames, which hereafter are referred to as projected video frames or a projected picture. The region boundaries are artificial in that they do not represent an actual physical boundary in the captured scene since in spherical video the scene is captured in all directions. Hence, the pixel regions in a projected video frame or picture do not reflect the spatial continuity of the signal. For example, two groups of neighbouring pixels in a projected video frame, that are separated by a region boundary may not be neighbours in the original captured 360 video signal. Hence, a natural phenomenon in the real-world 360 video signal may lead to significant, artificial movements in the projected video frame or picture when for example an object traverses a region boundary.

Current state-of-the-art video coding standards have adopted a hybrid video coding system, including a combination of intra-prediction and inter-prediction, wherein an input video signal is processed on a block-by-block basis. Here, a coding block (or in short a block) refers to a basic processing unit of a video standard. Coding blocks may be named differently in different coding standards, for example in H.264/AVC a coding block be referred to a macroblock, in HEVC a coding block may be referred to as a coding tree unit (CTU) and in VP9 and AC1 a coding block may be referred to as a super block.

When encoding video frames or pictures comprising region boundaries using a state-of-the art encoding standard, the region boundaries may lead to reduced coding performance, e.g. a higher visual impairment at a given target bit rate, or a higher bit rate for a target visual quality. The region boundaries may interfere with existing features of a state of the art coding system such as inter-frame prediction, motion compensation and spatial intra-frame prediction. For example, the region boundaries may increase the entropy in the motion vectors and reduce the compression gain. In most extreme cases, the motion vectors are restricted to a certain area of the frame. In that case, no motion vector will be used to predict between two video frames an object going from one frame edge to another, hence decreasing the ability of the encoder to efficiently compress the video sequence.

Additionally, when objects in a video frame or a picture cross region boundaries, there is an increased risk that an encoder use different encoding strategies for pixels associated with different pixel regions. This way, one part of an object may be encoded with a coding strategy that is different from the other part of the object. For example, an encoder may use different prediction parameters to predict pixels associated with the different pixel regions in a single frame. After decoding the encoded data into 2D rectangular frames or pictures, the playout device renders a spherical surface and textures the spherical surface with the video frames. The different encoding strategies may cause differences in quality, which may be become visible in the rendered video images as one or more artefacts, e.g. as a thin line or the like in the rendered picture, and thus degrading the visual quality of the rendered content.

Hence, from the above it follows there is a need in the art for improved methods and systems for coding spherical video data. In particular, there is a need in the art for methods and systems that are able to code, i.e. encode and decode spherical video data such that detrimental effects of the transformation of the spherical video data in rectangular video frames or pictures are reduced, such that the encoding efficiently increased and/or the visual quality of the rendered content is improved.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Projected video frames or pictures, resulting from projecting spherical video data (e.g. 360 or omnidirectional video data) onto a rectangular video frame or picture using a projection model (e.g. a EPR or cubic projection model), comprises pixel regions. These pixels regions have the same shape as the 2D projection faces of the projection model that was used to project and map the spherical video data onto a 2D rectangular area (e.g. square pixel regions matching the square projection faces of a cube projection mode). The pixel regions are arranged (e.g. via a mapping and, optionally, a packing operation) to form a rectangular video frame wherein neighbouring pixel regions in the video frame may form the region boundaries. These region boundaries may lead to reduced coding performance and degradation in the visual quality of the rendered content. Hereunder, the terms video frames and pictures are used interchangeably. Additionally the edges of pixel regions, when artificially created due to the use of a projection model, when coinciding with the edges of a projected video frame, may also be referred to as region boundaries. This in particular, though not exclusively, applies to the use of an equirectangular projection model.

It is an aim of the embodiments in this disclosure to reduce the detrimental effect of pixel regions, in particular boundaries of pixel regions, in projected video frames that may cause encoding inefficiency (i.e. increase the number of bits needed to encode a video frame) and/or distortions in the reconstructed video frames.

One of the insights of the invention is that a cost function related to the encoding of the spherical content in a projected video frame (which includes costs associated with encoding and distortion introduced by the encoding) can be minimized by evaluating different candidates of an input video frame (hereafter referred to as candidate video frames), wherein each candidate video frame is generate by modifying region boundaries of the input video frame.

Modifications may be introduced in an input video frame by applying one or more pixel operations, i.e. shift, mirror and/or rotation operations, to one or more groups of pixels in a projected video frame in order to minimize detrimental effects due to the region boundaries on the coding performance and the visual quality of the coded content. A group of pixels may define a pixel region or one or more coding blocks. Different modifications of a projected video frame (candidate video frames) may be evaluated and associated with a rate distortion costs using a rate distortion analysis.

In an aspect, the invention may relate to a method of forming a bitstream by an encoder apparatus.

In an embodiment, the method may include a processor of the encoder apparatus receiving a projected video frame having a pixel area which includes one or more pixel regions, the one or more pixel regions having pixels representing spherical video data projected onto one or more 2D projection surfaces of a projection model, and the one or more 2D projection surfaces being mapped to said one or more pixel regions, preferably in a one-to-one manner (e.g. one 2D projection surface maps to one pixel region); the processor generating a plurality of different candidate video frames on the basis of the received projected video frame, each candidate video frame being generated by applying one or more pixel operations to pixels of said projected video frame, at least one of said one or more pixel operations being different each time one of said plurality of different candidate video frames is being generated; the processor applying a rate distortion analysis to each of the candidate video frames to determine a rate distortion cost for each of the candidate video frames; and, the processor selecting a candidate video frame from said plurality of candidate video frames on the basis of the rate distortion cost; and, generating an output bitstream on the basis of the selected candidate video frame. Preferably a candidate with the lowest rate distortion cost is selected. The candidate with the lowest rate distortion cost preferably yields the best trade-off between coding efficiency and image distortion.

This embodiment provides an optimization scheme for coding spherical video data, in which candidate video frames are generated by modifying region boundaries of an input video frame using pixel operations. The candidate video frames are evaluated on the basis of a rate distortion analysis and the best candidate video frame is selected on the basis of the rate distortion costs associated with each of the candidate video frames. The encoding optimization scheme may be performed as part of the encoding process. Metadata associated with the modification may be transmitted in the bitstream to decoders such that each decoder can reverse the modification and recover the original video signal.

The encoding optimization scheme according to the invention includes the generation of several versions of a projected video frame, wherein in each version of a projected video frame one or more region boundaries are modified. These different versions of the projected video frame (i.e. the modified projected video frames) may be referred to as candidate video frames. Each candidate video frame may be partitioned in coding blocks and is then subjected to a rate distortion (R-D) optimization process, e.g. a conventional R-D optimization process, in which for each coding block of a candidate video frame encoding parameters are optimized on the basis of intra-prediction and/or inter-prediction using (minimization of) a cost function. Here, a cost function may include a distortion parameter D and a rate parameter R. The encoded candidate video frame that exhibits the lowest costs in terms of distortion and rate is then selected and being used in the process of generating an output bitstream performed by the encoder apparatus.

In an embodiment, a pixel operation may be defined as applying at least one of a shift, mirror and/or rotation operation to one or more groups of pixels. The one or more shift, mirror and/or rotation operation to one or more groups of pixels in a projected video frame may include any type of geometric pixel manipulation. For example, a pixel shift operation may include a pixel translation operation of a plurality of group of pixels, the replacement a first group of pixels in a first pixel region with a second group of pixels in a second pixel region or a combination thereof.

In an embodiment, each of the one or more groups of pixels defines one or more coding blocks within one of the one or more pixel regions. In another embodiment, at least one pixel region comprising a Counting Number (i.e. an Integer Number) of coding blocks. In these embodiments, candidate frames may be generated by modifying coding blocks in the projected video frame.

Hence, the encoder apparatus may use a block-based video coding standard for encoding projected video frames, wherein a coding block refers to a basic processing unit of a video standard. Coding blocks may be named differently in different coding standards, for example in H.264/AVC a coding block be referred to a macroblock, in HEVC a coding block may be referred to as a coding tree unit (CTUs) and in VP9 and AC1 coding blocks may be referred to super blocks.

In some block-based video coding standards, such as HEVC, coding blocks may be iteratively subdivided in smaller blocks. For example, a CTU (including one so-called Coding Tree Block (CTB) luma samples and two CBCs of chroma samples) may be recursively split in smaller blocks such as Coding Block (CBs). The CUs represent the processing units to which a coding mode (e.g. intra-prediction mode and inter-prediction mode) is assigned. A CU can be further split in so-called prediction units (PU) which are the basis units at which intra- and inter prediction is processed. Further, for the purpose of transform coding residuals a CB can be partitioned into a plurality of Transform Units (TUs).

Hence, a projected video frame may be partitioned in a plurality of coding blocks. For example, at the highest partitioning level, the projected video frame may be divided in coding blocks of a predetermined block size, typically the largest block size the encoder and an associated decoder can handle, or coding blocks of smaller block size.

The rate distortion analysis evaluates a block-partitioned candidate video frame on the basis of coding blocks. As different candidate frames may comprise one or more of the same sets of pixels (pixel arrangements) or even one or more of the same coding blocks, the results of an rate distortion analysis of one candidate video frame may be (partly) used in the rate distortion analysis of another candidate video frame. This embodiment, thus provides an efficient content agnostic and projection model agnostic way of generated different candidate frames for evaluating candidate video frames during the R-D optimization process.

In an embodiment, the determination of a rate-distortion (RD) cost may include: for a first coding block (a current coding block, i.e. a coding block that needs to be encoded) of a block-partitioned candidate video frame, the video encoder computing one or more predicted first coding blocks using one or more intra-prediction modes respectively; and, the video encoder determining a difference between each of the predicted first coding blocks (as determined on the basis of the one or more intra-prediction modes) and the first coding block, wherein the difference between a predicted first coding block and the first coding block defines a residual first coding block (wherein all residual first coding blocks of a video frame form a first residual video frame).

Hence, this way, for each of the one or more predicted first coding blocks as predicted by one of the one or more intra-prediction modes, an associated residual first coding block is determined. The video encoder may transform the one or more residual first coding blocks from the spatial domain to the frequency domain and quantize each of the one or more transformed residual first coding blocks to generate one or more encoded residual first coding blocks respectively.

The video encoder may determine one or more first distortion parameters D for each of the one or more encoded residual first coding blocks by decoding the one or more encoded residual first coding blocks into one or more decoded first coding blocks and compare the one or more decoded first coding blocks with the first coding block (the current coding block).

Further, in an embodiment, the video encoder may determine one or more rate parameters R for the one or more encoded residual first coding blocks respectively and associated first metadata, i.e. first decoder information for enabling a video decoder to decode a bitstream generated by the video encoder. Here, the one or more rate parameters R may include information about an amount of bits needed to signal an encoded residual first coding block and associated first decoder information.

Similarly, in an embodiment, the determination of a rate-distortion (RD) cost may include: for a first coding block (a current coding block, i.e. a coding block that needs to be encoded) of a candidate frame, the video encoder computing one or more predicted second coding blocks using one or more inter-prediction modes respectively; and, the video encoder determining a difference between each of the predicted second coding blocks (as determined on the basis of the one or more inter-prediction modes) and the first coding block, wherein the difference between a predicted second coding block and the first coding block defines a residual second coding block (wherein all residual second coding blocks of a video frame form a second residual video frame).

Hence, this way, for each of the one or more predicted second coding blocks as predicted by one of the one or more inter-prediction modes, an associated residual second coding block is determined. The video encoder may transform the one or more residual second coding blocks from the spatial domain to the frequency domain and quantize each of the one or more transformed residual second coding blocks to generate one or more encoded residual second coding blocks respectively.

The video encoder may determine one or more second distortion parameters D for each of the one or more encoded residual second coding blocks by decoding the one or more encoded residual second coding blocks into one or more decoded second coding blocks and compare the one or more decoded second coding blocks with the first coding block (the current coding block).

Further, in an embodiment, the video encoder may determine one or more second rate parameters R for the one or more encoded residual second coding blocks respectively and associated second metadata, i.e. second decoder information for enabling a video decoder to decode a bitstream generated by the video encoder. Here, the one or more second rate parameters R provide information about an amount of bits needed to signal an encoded residual second coding block and associated second decoder information.

Hence, for each candidate frame distortion and rate parameters of coding blocks may be determined and used to select a candidate frame from the plurality of candidate frames that provides the best trade-off between a number of bits used for encoding a video frame (and optionally associated metadata) versus the distortion that is introduced by using the number of bits for encoding.

In an embodiment, each of the one or more groups of pixels defines pixels within one of the one or more pixel regions. In a further embodiment, a group of pixels defines a pixel region. In these embodiments, candidate frames may be generated by modifying pixel regions in the projected video frame. The pixel regions provide a limited number of modifications wherein at least a part of these modifications can be linked to a particular rotation of the spherical video data. These embodiments thus allow a content agnostic way of generated different candidate frames associated with different rotation vectors for evaluation in the R-D optimization process. For example, different mapping or packing arrangements of pixel regions in a projected video frame may be evaluated. In an embodiment, at least one pixel region in said projected video frame comprises an integer number of coding blocks.

In an embodiment, the generation of the plurality of candidate video frames may be further based on metadata associated with the received projected video frame, preferably the metadata including information about at least one of: the projection model, the size of the one or more pixel regions, the location of the one or more pixel regions in the projected video frame; and/or, the geometry of the one or more pixel regions. Hence, in these embodiments, information about the pixel regions and the relation of different pixel regions in a projected video frame may be used in the formation of different candidate video frames.

In an embodiment, the generating of the output bitstream includes: determining decoder information, the decoder information including information for enabling a decoder apparatus to reverse said one or more pixel operations applied to generated said selected candidate video frame; and,
coding the selected candidate frame, and optionally the decoder information, in a sequence of bits, preferably the coding including the use of an entropy coding algorithm.

In an embodiment, at least part of the decoder information may be inserted as one or more network abstraction layer, NAL, units in the bitstream. In an embodiment, at least part of the decoder information may be inserted in the header of one or more VCL NAL units in the bitstream. In these embodiments, the decoder information that is needed by a decoder information is coded together with the selected candidate video frames into a bitstream.

In an embodiment, the generation of the plurality of candidate video frames may be based on at least part of the video content in the projected video frame. In an embodiment, the generation of the plurality of candidate video frames may be based on one or more image analysis parameters associated with the video content in the projected video frame. In an embodiment, the one or more image analysis parameters being determined on the basis of at least one of: an entropy analysis, a saliency analysis, a colour shift analysis, a motion magnitude and/or a motion direction analysis, an object analysis, a colour shift analysis, a boundary analysis, an edge detection analysis. In these embodiment, different candidate video frames are determined using information about the spherical video data in the projected video frame. For example, image analysis may be used in order to select candidate video frames in which the number of discontinuities that occur at the boundaries of pixel regions is minimized.

In an embodiment, the generating a plurality of different candidate video frames may include: reconstructing spherical video data on the basis of the received projected video frame; selecting a plurality of rotations on the basis of an image analysis algorithm; and, generating the plurality of different candidate video frames by rotating the spherical video data on the basis of a rotation and projecting the rotated spherical video data onto a 2D rectangular plane. In this embodiment, the encoder and decoder may be aware of the projection model that was used for generating the projected video frames. Hence, when receiving a projected video frame, the encoder may transform the video frame back to spherical video data and use different rotations of the pixel sphere to generate different candidate video frames.

In an embodiment, during the rate distortion analysis of the candidate video frames, at least part of the information associated with a rate distortion analysis of a first candidate video frame of the plurality of video frames is used in the rate distortion analysis of a second candidate video frame of the plurality of video frames, preferably the information relating to one or more pixel arrangements (sets of pixels) of the first candidate video frame that are similar to one or more respective pixel arrangements of the second candidate video frame. This embodiment recognizes that there may be redundant configurations of pixel arrangement across the several candidate frames. For instance, if several candidate video frames are generated by shifting columns of coding blocks, the different candidate video frames may contain one or more regions with identical content which is only shifted in position in the video frame. Since a state of the art encoding process is based on the evaluation of coding block, it can happen that two coding blocks have the same entropy coding context and surrounding blocks within several candidate frames. As a result, the encoder may reuse some of the calculations for a predetermined coding block of a predetermined candidate frame for another coding block with the same context in another candidate frame. This way, the amount of computations and the encoding time can be reduced. These computations related to the cost of encoding a candidate video frame may include operations such as signal transformation, quantisation, etc. on sets of pixels that are identical across multiple candidate video frames RDO. As a result, the encoder may speed up the process of calculating one candidate video frame cost by reusing some already calculated information from past candidate video frame RDO.

In an aspect, the invention may relate to a method of forming a video signal by a decoder apparatus comprising: a processor of the decoder apparatus receiving a bitstream comprising projected video frames, a projected video frame having a pixel area which includes one or more pixel regions, the one or more pixel regions having pixels representing spherical video data projected onto one or more 2D projection surfaces of a projection model, and the one or more 2D projection surfaces being mapped to said one or more pixel regions; the processor receiving decoder information associated with the encoded projected video frame, the decoder information including information for reversing one or more pixel operations that were applied during encoding to one or more groups of pixels of said projected video frame, preferably a group of pixels defining a pixel region and/or one or more coding blocks, a pixel operation being defined as applying at least one of a shift, mirror and/or rotation operation to one or more groups of pixels; and, the processor forming a video signal on the basis of the bitstream, the forming of the video signal including decoding encoded projected video frames in the bitstream and using the decoder information to reverse the at least one pixel operation, preferably the video signal being arranged for being rendered on a display. In embodiment of the invention the video signal is subsequently being rendered on a display, optionally a display of a head mounted device.

In an embodiment, the decoder information may be contained in the bitstream. In an embodiment, the decoder information may be contained in one or more SEI messages in the bitstream. In an embodiment, the decoder information may be contained in one or more network abstraction layer, NAL, units, preferably in the header of one or more VCL NAL units, in the bitstream.

In another aspect, the invention may relate to an encoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a projected video frame having a pixel area which includes one or more pixel regions, the one or more pixel regions having pixels representing spherical video data projected onto one or more 2D projection surfaces of a projection model, and the one or more 2D projection surfaces being mapped to said one or more pixel regions; generating a plurality of different candidate video frames on the basis of the received projected video frame, each candidate video frame being generated by applying one or more pixel operations to pixels of said projected video frame, a pixel operation being defined as applying at least one of a shift, mirror and/or rotation operation to one or more groups of pixels, at least one of said one or more pixel operations being different each time one of said plurality of different candidate video frames is being generated; applying a rate distortion analysis to each of the candidate video frames to determine a rate distortion cost for each of the candidate video frames; and, selecting a candidate video frame from said plurality of candidate video frames on the basis of the rate distortion cost; and, generating an output bitstream on the basis of the selected candidate video frame.

In a further aspect, the invention may relate to a decoding device comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a bitstream comprising projected video frames, a projected video frame having a pixel area which includes one or more pixel regions, the one or more pixel regions having pixels representing spherical video data projected onto one or more 2D projection surfaces of a projection model, and the one or more 2D projection surfaces being mapped to said one or more pixel regions; receiving decoder information associated with the encoded projected video frame, the decoder information including information for reversing one or more pixel operations that were applied during encoding to one or more groups of pixels of said projected video frame, preferably a group of pixels defining a pixel region and/or one or more coding blocks, a pixel operation being defined as applying at least one of a shift, mirror and/or rotation operation to one or more groups of pixels; and, forming a video signal on the basis of the bitstream, the forming of the video signal including decoding encoded projected video frames in the bitstream and using the decoder information to reverse the at least one pixel operation, preferably the video signal being arranged for being rendered on a display. In embodiment of the invention the video signal is subsequently being rendered on a display, optionally a display of a head mounted device.

In an embodiment, the decoder information may be contained in the bitstream. In an embodiment, the decoder information may be contained in one or more SEI messages in the bitstream. In an embodiment, the decoder information may be contained in one or more network abstraction layer, NAL, units, preferably in the header of one or more VCL NAL units, in the bitstream.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 depicts a flow-diagram of processing spherical video data.

FIG. 2 depicts an example of an equirectangular projection of spherical video data.

FIGS. 5A and 5B depicts the formation of region boundaries in a video frame comprising projected spherical data.

FIG. 6A-6C depicts the formation of region boundaries in a video frame comprising projected and mapped spherical data.

FIG. 15A-15C depict examples of image analysis for determining a modification in a projected video frame according to an embodiment of the invention.

DETAILED DESCRIPTION

FIG. 1 depicts a high-level flow diagram of a method for processing spherical content. The process may include the capturing of multiple images (step 102) using a panoramic or 360-degree image capturing system, which typically comprises multiple, i.e. two or more image sensors. Images of overlapping field of views, generated by different image sensors, may be stitched together (step 104) into one panorama or high-resolution image.

The stitching of images into one image is a well-known image processing technique, that typically includes alignment and panorama composition. In the alignment process, feature descriptors may be extracted from images in order to find corresponding image features. The alignment is used to estimate the image camera pose or orientation of each image. The panorama composition procedure subsequently uses this information for combining all images into one panorama image. Image blending may be used to seamlessly stitch the thus combined images together. The stitching of the images may be in a 2D or 3D plane. For example, images may be stitched to each other onto a spherical surface thereby forming a spherical video data.

Thereafter, the spherical video data may be transformed by projection and mapping operations (step 106) into 2D rectangular video frames which are encoded by a state-of-the-art video encoder (step 108). The encoded video data may be encapsulated into a transport container so that the video data can be transmitted to a playout device, which is configured to decode the video data (step 110) into 2D rectangular frames. For presentation of the content to the user, the playout device renders a 3D (polyhedronic) object, and textures it with the video frames (step 114). Depending on the projection that was used, the 2D rectangular frames are then transformed back into omnidirectional video data by reversing the packing, mapping and projection operations (step 112). The encoding process 108 may be implemented in a video encoder apparatus and steps 110-114 may be implemented in a media playback devices connected to or integrated in e.g. an head mounted display (HMDs), which are configured to decode and render the encoded spherical video data.

The transformation of the spherical video data by projection and mapping operations into 2D rectangular video frames is described in more detail with reference to FIG. 2-4.

FIG. 2 depicts an example of an equirectangular projection operation 204 of spherical video data 202, represented as pixels on a spherical surface (e.g. a sphere or a squished sphere), onto a rectangular 2D video frame 206. This projection operation may be used to directly transform pixels associated with spherical coordinates $\phi,\theta$ to pixels associated with planar 2D coordinates X,Y.

Figure 3:
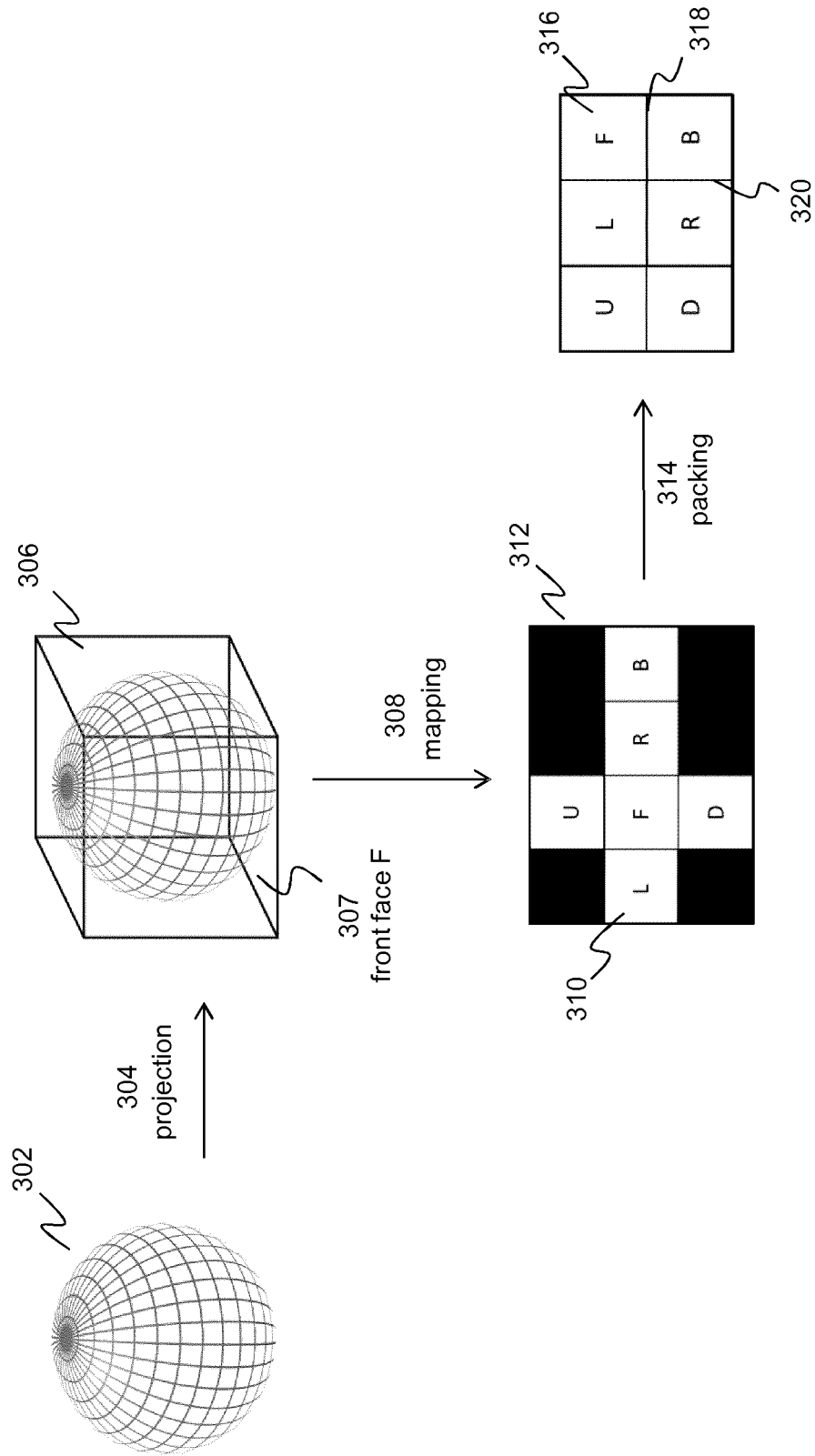
FIG. 3 depicts an example of a projection and a mapping of spherical video data onto a video frame.

Similarly, FIG. 3 depicts an example of projecting of spherical video data 302 onto a rectangular video frame using a cube projection model. In particular, FIG. 3 depicts a projection operation 304 of the spherical video data onto the faces 306 of a cube. These faces may be referred to as the 2D projection faces. The orientation of the sphere and the cube may be described using a 3D coordinate system such that different orientations of the sphere, the cube and the sphere relative to the cube can be defined. For example, in such coordinate system the cube faces may be labelled as front face (F), up face (U), down face (D), left face (L), right face (R) and back face (B). After the projection of the pixels onto the projection faces, the projection faces of the cube are mapped 308 onto a planar 2D rectangular video frame 312. Here, the pixels belonging to a projection face may be referred to as a pixel region or in short a region. For example, the pixels associated with the front projection face F 307 of the cube may form pixel region F in the rectangular video frame 312.

Hence, as shown in FIG. 3, during the mapping operation 308, the cube comprising projected pixels on its faces may be unfolded and arranged in a rectangular 2D area forming a video frame. The thus formed video frame may be referred to as a projected video frame. A projected video frame comprises an arrangement of pixel regions wherein edges of pixel regions may form region boundaries. The artificial region boundaries are a direct consequence of the projection/mapping operation and the shape of the pixel regions are a direct consequence of the projection model that is use (in this case a cube projection model).

The pixel regions in the projected video frame may be rearranged and resized in order to remove black spaces. The process of rearranging the pixel regions may be referred to as packing 314. The resulting projected video frame includes a 2D arrangement of pixel regions 316 including horizontally and vertically arranged region boundaries 318,320.

More generally, transforming spherical video data into a rectangular video frame may include a projection of the spherical video data onto one or more 2D projection faces of a projection model, typically a 3D polyhedron such as a cube or a pyramid, followed by a mapping of the faces onto a rectangular frame. The faces of the, preferably 3D, projection model may be referred to as projection faces and a video frame resulting from the projection operation onto the projection faces may be referred to as a projected video frame. A projected video frame may include pixel regions (blocks of pixels) that match the 2D projection faces of the projection model that was used (e.g. the faces of a cube). The pixel regions are arranged to form a rectangular video frame wherein the edges of the pixel regions may form region boundaries of the projected video frame. A projected video comprising a packed arrangement of pixel regions may also be referred to as a region-wise packed video frame.

Figure 4:
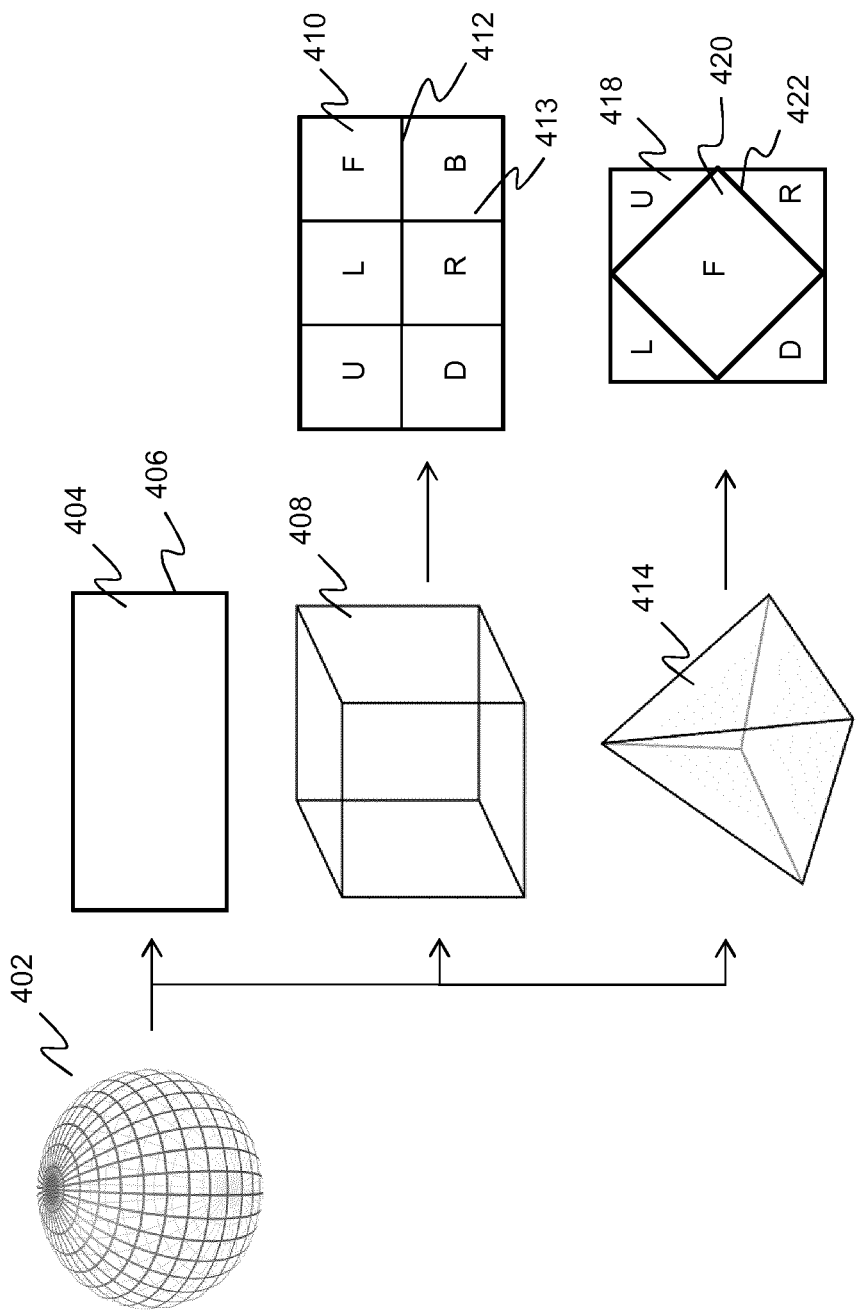
FIG. 4 depicts different projections and mappings of spherical video data onto a video frame.

As shown in FIG. 4, depending on the selected projection model, i.e. equirectangular 404, cubic 408, pyramid 414, etc. different arrangements of pixel regions 404,410,418,420 and associated region boundaries 406,412,413,422 in the projected video frames may be obtained. The spherical video data 402 that is projected onto the projection faces is mapped and packed into a projected video frame wherein each projection face represents a pixel region of a predetermined geometry and wherein the boundaries with neighbouring pixel regions or with the edge of a projected video frame, form artificial region boundaries. A shown in FIG. 4, depending on the projection type the region boundaries may have different orientations in the video frame. Many different projection types may be used including but not limited to a cylinder, a polyhedron (e.g. an octahedron or an icosahedron), a truncated pyramid, segmented sphere, etc.

The combined steps of projecting, mapping and, optionally, packing spherical video data into a projected video frame results in the generation of boundaries—which depending on the projection type may include horizontal, vertical, diagonal and/or off-diagonal region boundaries—that are not present in the spherical video data. These boundaries are artificial, in that they do not represent an actual, physical boundary in the captured scene.

FIGS. 5A and 5B depicts an example of the formation of region boundaries in a video frame comprising projected spherical data. In particular, FIGS. 5A and 5B depict an output of a two-lens 360 degree camera system. FIG. 5A depicts image data captured by the system wherein an object of interest (a person) is captured by the front lens. The associated equirectangular projected (ERP) video frame represents a projected video frame wherein the captured object of interest is located in the centre of the video frame. In this case, state of the art coding schemes are not or at least less suitable for predicting object movements in such video frames as—due to the used projection model—movement of an object do not follow the motion model that are in conventional video coding schemes, i.e. usually linear translation. State of the art coding schemes such as AVC and HEVC can linearly express translations of blocks of pixels using a vector. However, these schemes cannot cope with effects such as deformation (scale change) and rotation, which all occur in EPR video frames and which will affect movement of the objects in the video frame. If the object was captured by the back lens as shown in FIG. 5B, the object will be split across the frame boundary of the associated ERP video frame. In conventional video, such situations are unknown and a state of the art video encoder will not fail when trying to predict object movements between frames.

When using more complex projections, such as a cubic projection, additional boundaries may be introduced in the associated packed video frame making the situation even more complex for a conventional video encoder. As explained with reference to FIG. 3, the boundaries are related to the boundaries of pixel regions, i.e. groups of pixels belonging to different projection faces of the projection model, in this case cubic projection model, that was used in the projection. The formation of region boundaries in a video frame associated with a cubic projection is depicted in FIG. 6A-6C. As shown in these figures natural movement in the scene, which captured as a continuous movement on the 3D sphere (of FIG. 3), may lead to artificial movement in the projected and mapped video, resulting in edge artefacts across the cube faces.

Projection of spherical video data as illustrated in FIGS. 5 and 6 thus results in region boundaries which may negatively influence the coding performance in terms of rate and distortion. These boundaries hereafter are referred to as region boundaries. When encoding such video content with a state-of-the art encoding scheme, such as H.264/AVC or HEVC, the introduced motion may lead to a reduced coding efficiency; e.g. a higher visual impairment at a given target bit rate, or a higher bit rate for a target visual quality.

Since standardized and commercially available video encoding schemes, and reference video encoding scheme implementations from standardization bodies, employ motion compensation, such large and artificial movements increase the entropy in the motion vectors and reduce the compression gain. In practice, the motion vector search is restricted to a certain area of the frame in encoder implementation. In the most extreme case, no motion vector will be use to predict between different video frames an object going from one frame edge to another since outside of the motion vector search area, thereby decreasing the ability of the encoder to efficiently compress the video sequence.

In addition, standardized and commercially available video encoding schemes, and reference video encoding scheme implementations from standardization bodies employ spatial prediction, and large and artificial movements across region boundaries decrease the ability of the encoder to efficiently predict pixels blocks in the projected video frame by available neighbouring blocks in the same video frame, thereby decreasing the ability of the encoder to efficiently compress the video sequence.

It is an aim of the embodiments in this disclosure to reduce the detrimental effect of pixel regions, in particular boundaries of pixel regions, in projected video frames that may cause encoding inefficiency (i.e. increase the number of bits needed to encode a video frame) and/or encoding distortions in the video frame. These region boundaries are the result of a projection of spherical video data onto a 2D rectangular surface according to a projection model (e.g. an equirectangular or a cubic projection model).

One of the insights of the invention is that a cost function related to the encoding of the spherical content in a projected video frame, such as encoding costs and distortion costs, can be minimized by evaluating different candidates of an input video frame, wherein each candidate video frame is generate by modifying region boundaries of the input video frame.

Modifications may be introduced in an input video frame by shifting, mirroring and/or rotating one or more coding blocks in order to minimize detrimental effects due to the region boundaries on the coding performance and the visual quality of the coded content. Different modifications of a projected video frame (i.e. different candidate video frames) may be evaluated and associated with a rate distortion costs using a rate distortion analysis.

The invention provides an encoding optimization scheme, in which candidate video frames are generated by modifying region boundaries of an input video frame, evaluating the candidate video frames on the basis of a rate distortion analysis and selecting the best candidate video frame on the basis of rate distortion costs. The encoding optimization scheme may be performed as part of the encoding process. Metadata associated with the modification may be transmitted in the bitstream to decoders such that each decoder can reverse the modification and recover the original video signal.

Figure 7:
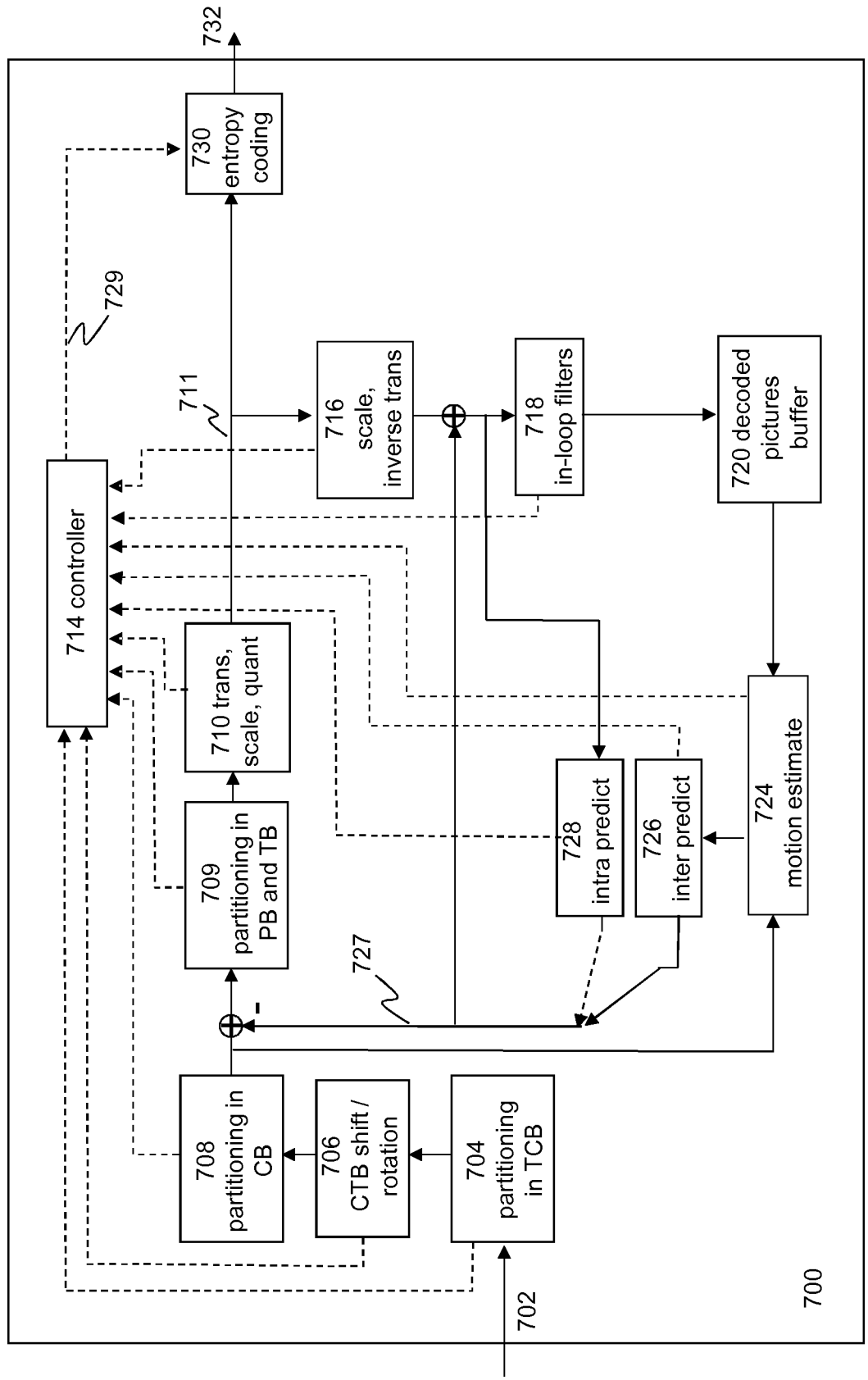
FIG. 7 depicts a block diagram of an encoder apparatus according to an embodiment of the invention.

FIG. 7 depicts a block diagram of an encoder apparatus according to an embodiment of the invention. The encoder apparatus may comprise an input for receiving a video signal 702 representing a sequence of projected video frames. The projected video frames may have a format that is used by the video equipment, e.g. a raw video format or the like. Then, partitioned projected video frames 704 may be generated by partitioning the projected video frames in a plurality of coding blocks. Here, a coding block may refer to a basic unit that is used by different modules in the encoder apparatus and an associated decoder apparatus.

At the highest partitioning level, the projected video frame is divided in coding blocks of a predetermined block size, typically the largest block size the encoder and associated decoders can handle. Thereafter, in some embodiments, the coding blocks of the projected video frame may be iteratively subdivided in smaller blocks. For example, when using an HEVC-based encoder, the largest coding block that can be processed by the encoder may be referred to as a Coding Tree Blocks (CTB). Coding blocks may be named differently in different coding standards, for example in H.264/AVC a coding block be referred to a macroblock. As said, in certain coding standards, a coding block may be (recursively) sub-partitioned in smaller coding blocks, such as HEVC-type Coding Blocks (CBs) 708, which are the basic units for intra- and inter coding prediction processes that are executed by the encoding apparatus. A size of a CB may be the size of an CTB or a predetermined portion thereof. The recursive splitting of a CTB in one or more CBs and, optionally, other logical blocks may depend on the type of content in the CTB: larger smooth regions, which may be encoded more effectively when large block sizes are used, while smaller blocks may be used for more textured and uneven regions.

A prediction signal 727 generated on the basis of information available from both the encoder and decoder apparatus may be subtracted from the partitioned input signal i.e. a partitioned projected video frame comprising coding blocks, in order to form a so-called residual picture.

In HEVC, the Coding Block of the residual picture (the part of the original signal which could not be predicted by the selected prediction method, e.g. an intra-prediction method or an inter-prediction method) may be further partitioned in logical blocks such as prediction blocks (PB) and transform blocks (TB) 709, wherein the TB is the basic unit for the transform and quantization process. A discrete cosine transform (DST) may be used to transform residual TBs into a potentially small number of transform coefficients. A transformed and quantized residual picture signal 711 may be generated by scaling and quantizing the transform coefficients 710. The transformed and quantized residual picture signal and the decoder information 729 (including prediction parameters and other information needed to reproduce the prediction signal at the side of a decoder apparatus) may be coded into a bitstream 732 using a suitable coding algorithm 730, e.g. an entropy coding algorithm.

A prediction signal for the current picture may be generated using an inter-prediction function 726 which uses blocks of previously decoded pictures. Alternatively, a prediction signal for the current picture may be generated using an intra-prediction function 728 using already decoded neighbouring samples within the current picture. In order to construct a prediction signal, the transformed and quantized residual picture signal 711 may be reconstructed by subjecting it to an inverse transform 716 and adding it to an already available prediction signal stored in a buffer. The thus formed signal may then be processed by one or more in-loop filters 718 and stored in the buffer 720 so that it can be used by the prediction processes.

For inter-prediction 726, a motion estimation function 724 may search for the best prediction available for a current picture block in the decoded picture buffer. For intra-prediction 728, sample values from already reconstructed neighbouring blocks of the current picture may be used for prediction. Depending on the encoder decision which prediction mode has been selected, either the intra-prediction signal or the inter-prediction signal may be used as prediction signal of the current block.

The encoder may perform a known rate-distortion optimisation process in order to find the best coding parameters for coding blocks in a picture. Here, the best coding parameters refer to the set of parameter that provide the best trade-off between a number of bits used for encoding a block versus the distortion that is introduced by using the number of bits for encoding. The term rate-distortion optimization is sometimes also referred to as R-D optimization or simply "RDO". RDO schemes that are suitable for AVC and HEVC type coding standards are known as such, see for example, Sze, Vivienne, Madhukar Budagavi, and Gary J. Sullivan. "*High efficiency video coding (HEVC)*." Integrated Circuit and Systems, Algorithms and Architectures. Springer (2014): 1-375; Section: 9.2.7 R-D Optimization.

R-D optimisation can be implemented in many ways. In one well-known implementation, the RDO problem can be expressed as a minimization of a Lagrangian cost function J with respect to a Lagrangian multiplier $$\lambda :\: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In order to reduce the computational costs, RDO is performed for each coding block independently and for different coding parameters: including mode decision; intra prediction mode estimation; motion estimation; and quantization. For each coding block a computation of the cost function associated with each combination of coding parameters is performed and the optimal solution for the coding block is the combination that minimizes the RD cost function. Hence, in such RDO scheme, each coding block of a video frame of the input video stream is optimized.

The encoder apparatus depicted in FIG. 7 may use an RDO process for optimizing the coding process for each coding block in an input video frame. This way a set of encoding parameters can be determined for a certain input video frame, typically a residual video frame, that allows the best trade-off between a number of bits used for encoding the video frame versus the distortion that is introduced by using the number of bits for encoding.

The invention provides an encoding optimization scheme for spherical video data that uses R-D optimization. The optimization scheme takes into account that the content in video frames comprises spherical video data, which is projected onto a 2D plane using a predetermined projection model. The encoding optimization scheme takes into account that introducing certain modifications in the region boundaries of a projected video frame during encoding may result in improved R-D costs when compared to the R-D costs of the original (non-modified) projected video frame.

The encoding optimization scheme according to the invention includes the generation of several versions of one projected frame wherein in each version the region boundaries are modified. These modified projected video frames may be referred to as candidate video frames. Each candidate video frame is then subjected to a R-D optimization process, e.g. a known R-D optimization process in which the conventional encoding parameters (intra-prediction, inter-prediction and motion compensation) are optimized per coding block using minimization of a cost function. The encoded candidate video frame that exhibits the lowest R-D costs is used in the formation of the output bitstream that is generated by the encoder apparatus.

Hence, during the execution of the encoding optimization scheme, different candidate video frames may be generated on the basis of a partitioned input video frame, e.g. an projected video frame that is divided in HEVC-types CTB. Each candidate video frame is generated by applying a modification in the spatial arrangement of coding blocks. Here, a modification may include one or more shifts, mirroring and/or rotation operations to one or more coding blocks in a partitioned projected video frame. During the RDO process, a known cost calculation may be executed for each of the encoded candidate video frames. The encoded candidate video frame that yields the best trade-off between coding efficiency and image distortion may be selected as the optimized candidate video frame.

The process of generating a candidate video frames and selecting an optimized candidate video frame, may be repeated for each projected video frame or each group of projected video frames that is fed to the input of the encoder apparatus. The thus optimized candidate video frames may be fed to the input of a coding module, e.g. an entropy coding module, for generating a bitstream comprising encoded spherical video content 730. This way, a bitstream comprising encoded spherical video content may be generated that provides the best or at least an optimized trade-off between coding efficiency and image distortion.

The encoding process executed by the encoder apparatus as depicted in FIG. 7 may be controlled by an encoder controller 714 which is adapted to generate decoding information, i.e. metadata associated with the encoding process which is needed by a decoder apparatus in order to decode the encoded bitstream. The decoding information may include information associated with the arrangement of coding blocks in partitioned projected video frames in the bitstream. In particular, the decoder information may comprise information about the modification of the arrangement of coding blocks of the projected video frame that was offered to the input of the encoder apparatus. The modification of the arrangement of coding blocks of the projected video frame may include one or more shift, mirror and/or rotation operations that were applied to coding blocks of a partitioned projected video frame that was fed to the input to the encoder apparatus as depicted in FIG. 7. The decoder information may be inserted in the bitstream that is generated by the encoder apparatus such that a decoder apparatus is able to correctly decode encoded partitioned projected video frames and to reverse the effect of the modification of the coding blocks in the projected video frame on the basis of the information in the bitstream.

Hence, as shown in FIG. 7, during the execution of the RDO algorithm, a projected video frame that is partitioned in coding blocks may be selected. Then, candidate video frames may be generated on the basis of the selected partitioned projected video frame, wherein each candidate video frame may be generated by applying one or more shift, mirroring and/or rotation operations to groups of pixels, preferably coding blocks, in the selected video frame. The candidate video frames may be encoded and the candidate video frame that is associated with a R-D distortion cost may be selected as the video frame that is used in the formation of a bitstream.

The bitstream may be formatted and packaged on the basis of a suitable data container format so that the encoded spherical video content may be stored and transmitted to one or more client apparatus that may comprise a decoder apparatus for decoding the video data in the bitstream. The client apparatus may further comprise a rendering engine for displaying spherical content that is decoded by the decoder apparatus to a user. The modification of the spatial arrangement of coding blocks in a partitioned projected video frame and the selection of the optimized video frame candidate may be introduced as an additional loop in the encoding process. This process is further explained with reference to FIG. 9.

During the formation of the bitstream by the encoder apparatus, decoder information (metadata), including information associated with the one or more shift, mirror and/or rotation operations of groups of pixels (e.g. coding blocks or pixel regions) in a projected video frame, may be inserted in the bitstream so that a decoder apparatus may extract the metadata from the bitstream in order to reverse the modification that was applied during encoding before the video frame is provided to a rendering engine.

Alternatively, the metadata associated with the selected video frame candidate may be provided to a client apparatus via an out-of-band transmission channel that is separate from the bitstream.

Figure 8:
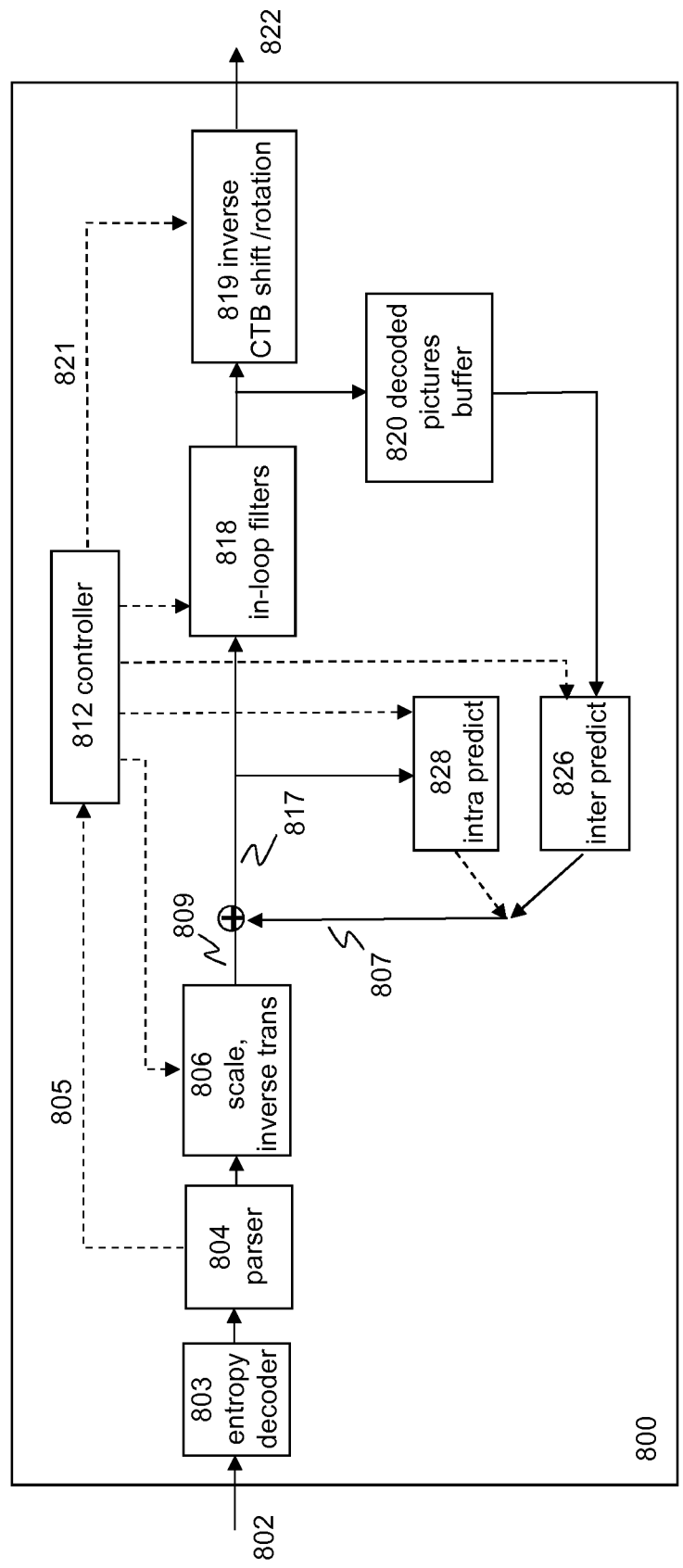
FIG. 8 depicts a block diagram of a decoder apparatus according to an embodiment of the invention.

FIG. 8 depicts a block diagram of a decoder apparatus according to an embodiment of the invention. In particular, FIG. 8 depicts a block diagram of a decoder apparatus that is adapted to receive a bitstream that is generated by an encoder apparatus as described with reference to FIG. 7. The decoder apparatus may receive the bitstream 802 comprising the encoded spherical video content at its input. An entropy decoder 803 may decode the information in the bitstream into a decoded signal, wherein the decoded signal includes decoder information (metadata) and information representing the content in the form of partitioned residual video frames. A bitstream parser 804 may be configured to extract decoder information 805 from the decoded signal and forward the decoder information to a decoder controller 812, which is adapted to send parts of the decoder information to the various functions that are executed during the decoding process.

In order to construct a picture representing a projected video frame, the information representing a residual video frame may be subjected to a scaling process and an inverse transform 806. A picture 817 representing a partitioned projected video frame may be formed by adding the residual picture signal 809 at the output of the inverse transfer function to an available prediction signal 807. Such prediction signal may be generated using an inter-prediction process executed by an inter-prediction function 826, which uses previously decoded pictures representing projected video frames stored in a buffer 820. The prediction signal may also be generated using an intra-prediction process executed by an intra-prediction function 828 which uses already coded neighbouring samples within the current picture.

The thus reconstructed picture 817 representing a projected video frame may then be processed by loop filters 818 (e.g. a deblocking filter) and stored in a decoded picture buffer 820 so that it can be used by the prediction processes. Further, the decoder controller may provide information 821 for reversing the shift, mirror and/or rotation operations that were applied to coding blocks of a partitioned projected video frame during encoding processor to a processor 819 that is adapted to use this information to reverse the shift and/or rotation operation. This way, the decoder apparatus may provide an output signal 822 that can be readily rendered by a rendering engine (not shown) that is adapted to render spherical video content.

According to an embodiment, the generation of candidate video frames may include any rotation transformation applied to the spherical video data of a projected video frame (e.g. any rotation to the sphere 302 as depicted in FIG. 3 defined by a rotation vector). This rotation transformation may then be reversed at the decoding stage as e.g. explained with reference to FIG. 8. However, as there are many degrees of freedom, such per-frame optimisation based on rotation transformations is highly computationally demanding.

Hence, in an embodiment, shift, mirror and/or rotation operations associated with an optimized video frame candidate may be applied to a first video frame of a Group of Frames (GOP).

In a further embodiment, the shift, mirror and/or rotation operations used for generating candidate video frames may be limited to a limited discrete set of shift, mirror and/or rotation operations of coding blocks. The advantage of an optimization process based on modifications in the arrangement of coding blocks in a partitioned projected video frame is that it does not require the knowledge of the projection model. Moreover, it may be implemented by simply selecting different arrangements of coding blocks such as HEVC-based coding blocks such as Coding Tree Blocks (CTBs).

In addition, there may be redundant configurations of pixel arrangement across the several candidate frames. For instance, if several candidate video frames are generated by shifting columns of coding blocks, the different candidate video frames may contain one or more regions with identical content which is only shifted in position in the video frame. Since a state of the art encoding process is based on the evaluation of coding block, it can happen that two coding blocks have the same entropy coding context and surrounding blocks within several candidate frames. As a result, the encoder may reuse some of the calculations for a predetermined coding block of a predetermined candidate frame for another coding block with the same context in another candidate frame. This way, the amount of computations and the encoding time can be reduced.

In the context of HEVC, the rate-distortion cost may require that the video encoder computes a predicted block using each of the available intra-prediction modes. The video encoder then determines a difference between each of the predicted blocks and the current block (which is commonly referred to as a "residual block" (of a residual video frame) and transforms each of the residual blocks from the spatial domain to the frequency domain. Next, the video encoder may quantize each of the transformed residual blocks to generate corresponding encoded video blocks. The video encoder may decode the encoded video blocks and compare each of the decoded video block to the current block to determine a distortion metric D. Moreover, this full rate-distortion analysis involves computing the rate R for each of the intra-prediction modes, i.e. the amount of bits used to signal each of the encoded video blocks.

Similarly, the rate-distortion cost may require that the video encoder computers a predicted block using one or more inter-prediction modes. The video encoder may then determine a difference between each of the predicted bocks and the current block and transform each of the residual block from the spatial domain to the frequency domain. Next, the video encoder may quantize each of the transformed residual blocks to generate corresponding encoded video blocks. The video encoder may decode the encoded video blocks and compare each of the decoded video blocks to the current block to determine a distortion metric D and the rate R for each of the inter-prediction modes.

The thus determined R-D costs may then be used to select a block that provides the best trade-off between a number of bits used for encoding a block versus the distortion that is introduced by using the number of bits for encoding.

Figure 9:
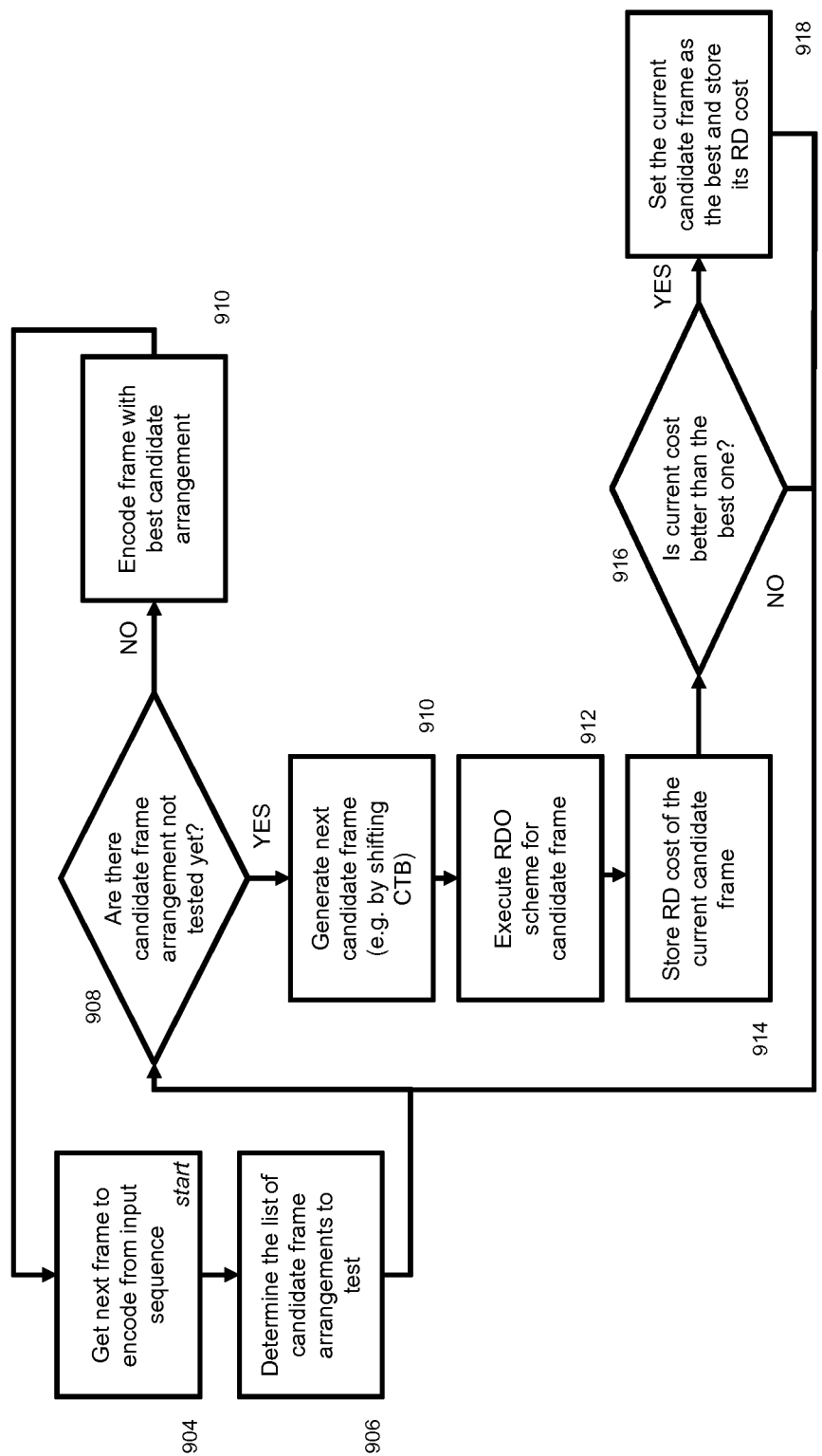
FIG. 9 depicts a flow diagram of encoding optimization process for spherical video data according to an embodiment of the invention.

FIG. 9 depicts a flow diagram of encoding optimization process for spherical video data according to an embodiment of the invention. The process depicted in FIG. 9 may be executed by an encoding apparatus as described with reference to FIG. 7. The process may start with the reception of a projected video frame partitioned in coding blocks representing the largest blocks of pixels the encoder can handle (step 904). In an embodiment, additional information associated with the projected video frame (metadata) may be received as well. The metadata may include information about the partitioned projected video frame, e.g. size and/or amount of coding blocks, projection model used, size of the pixel regions (e.g. in the case of a projection region) etc. A list of candidate video frames, i.e. modified versions of the received partitioned projected video frame, may be determined (step 906) that is used in the optimization process. The list of candidate video frames may be defined in terms of one or more shifts and/or rotation operations applied to one or more coding blocks in the received partitioned projected video frame. Thereafter, the different candidate video frames may be tested in an optimization loop in which each candidate video frame is subjected to a cost calculation.

The loop may start with testing whether candidate video frames need to be tested (step 908). If so, the candidate video frame may be generated by shifting and/or rotating one or more coding blocks in the partitioned projected video frame in accordance with the information in the list of candidate video frames (step 910). Thereafter, the generated candidate video frame is subjected to a cost calculation (step 912).

For example, in an embodiment, the candidate video frame may be subjected to a rate distortion optimization (RDO) scheme. Such RDO scheme may include the computation of rate-distortion cost. Such a scheme may include computation of a predicted block using each or at least part of the available intra-prediction modes. Determining difference between each of the predicted blocks and a "residual block" that specifies the residual pixel values, transforming each of the residual block from the spatial domain to the frequency domain and quantizing each of the transformed residual blocks to generate corresponding encoded video block. Additionally, such scheme may include computation of a predicted block using the available inter-prediction modes. Finally, the video encoder may decode the encoded video block, comparing each of the decoded video blocks to the current block to determine a distortion metric. Moreover, the rate-distortion analysis may include computing, for each or at least part of the intra-prediction modes and/or inter-prediction modes, the amount of bits used to signal each of the encoded video blocks, i.e. the bit costs. Finally, the block that provides the best balance between distortion and bit costs (the RD cost) may be selected. This scheme may be applied to each block of the partitioned candidate frame thereby providing an RDO optimized encoded candidate video frame with associated RD cost.

The RD costs of current encoded candidate frame may be stored and compared with RD costs of earlier encoded candidate frames (step 916). If that is the case, the current candidate video frame and the associated RD costs may be stored as best candidate video frame (step 918). Thereafter, it may be determined if the list comprises a further candidate video frame for calculating an RD cost (step 908). If this is not the case, the best encoded candidate video frame, i.e. the candidate video frame with the best RD costs, may be selected by the encoder apparatus for use in the output bitstream (step 910).

The encoding optimization process as illustrate in FIG. 9 thus selects a candidate video frame, i.e. the input partitioned projected video frame in which one or more coding blocks have been subjected to one or more shift, mirror and/or rotation operations.

Figure 10:
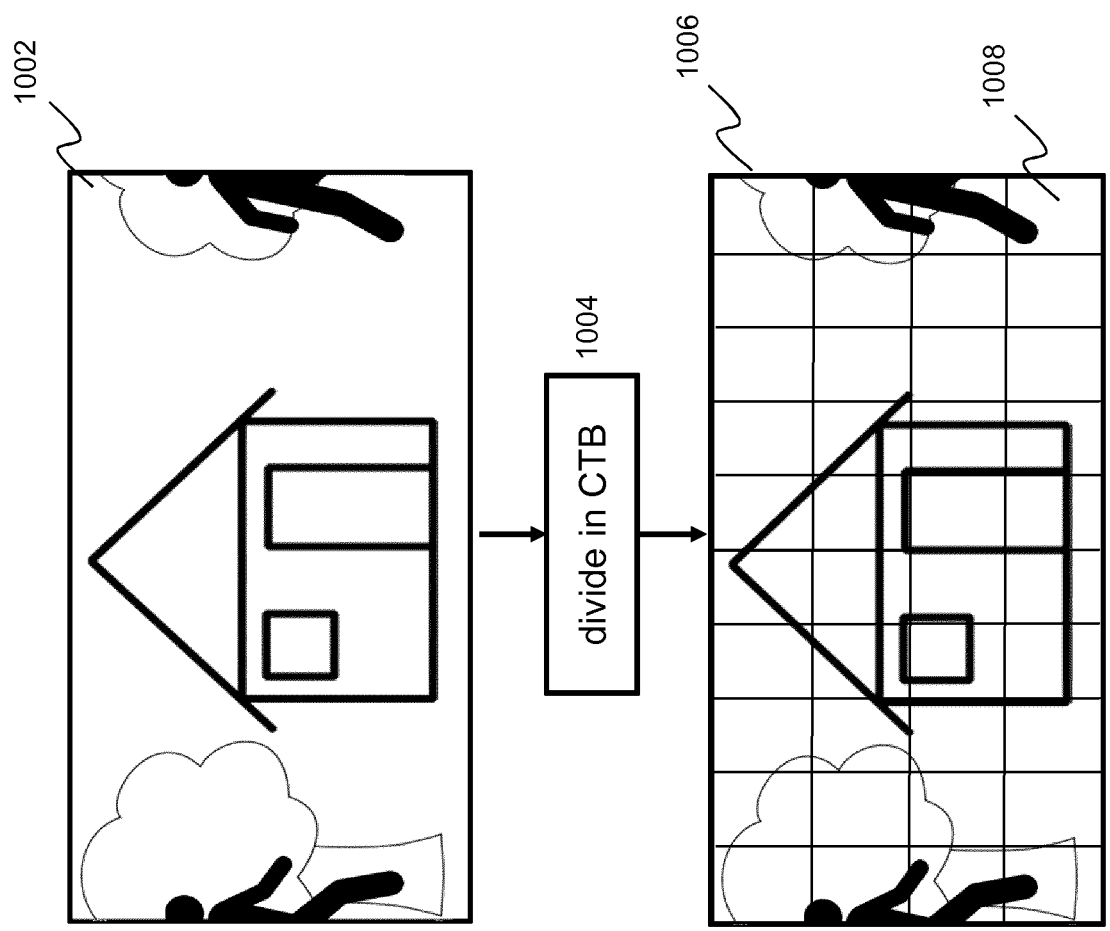
FIG. 10 depicts an example of the partitioning of a projected video frame into coding blocks.

FIG. 10 depicts an example of the partitioning of a projected video frame 1002 into coding blocks. The partitioning process 1004 results in a partitioned projected video frame 1006 comprising coding blocks 1008 representing the largest block of pixels that can be handled at once during encoding, for example HEVC-type CTBs or AVC-type macroblocks. In this example, the projected video frame comprises equirectangular projected video data wherein a horizontal translation (a horizontal shift) of rows of pixels to the right side or to the left side of the video frame corresponds to rotating the content sphere along the axis pole as e.g. explained with reference to FIG. 2. For each video component, e.g. luma and two chromas, the picture may be subdivided into a grid of square-shape coding blocks which may be referred to as Coding Tree Blocks (CTBs). The group of the CTB luma and 2 CTBs chroma for a given portion of the picture is referred to as a Coding Tree Unit (CTU).

Figure 11:
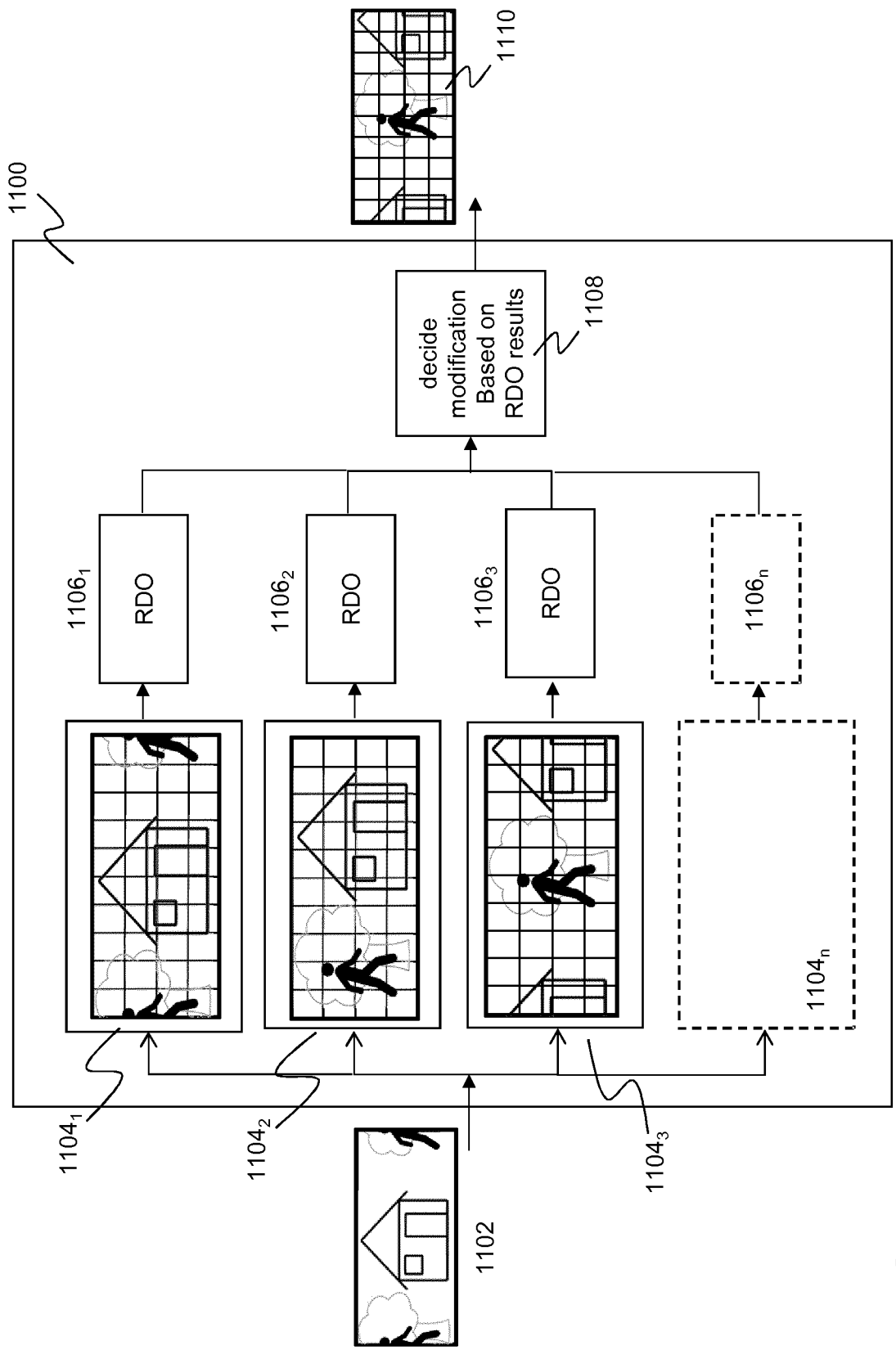
FIG. 11 shows an example of part of an encoding optimization process for spherical video data according to an embodiment of the invention.

FIG. 11 shows an example of part of an encoding optimization process for spherical video data according to an embodiment of the invention. The process may be executed by the encoder apparatus as described with reference to FIG. 7. In particular, FIG. 11 depicts an example of an encoding optimization process wherein different candidate versions 1104$_{1-n}$ of a partitioned (equirectangular) projected video frame are generated by the encoder apparatus and subsequently subjected to an RDO algorithm 1106$_{1-n}$. In this embodiment, the video frame candidates may be generated by shifting columns of coding blocks of luma and chromas components within the RDO loop of the encoder. To that end, the encoder apparatus may partition an input picture 1102 in coding blocks of a predetermined size. This partitioning process results in a partitioned projected video frame 1104$_1$. An example of a partitioning process is described with reference to FIG. 10. Further, a number of video frame candidates may be created on the basis of the partitioned projected video frame by shifting one or more columns of CTBs in a predetermined direction (to the right in this example). For example, in FIG. 11 second video frame candidate 1104$_2$ may be generated by shifting the pixels of the first video frame candidate 1104$_2$ (in this case the partitioned input video frame) two coding blocks to the right.

It is noted that the shift operations depicted in FIG. 11 is only an example of a large number of possible shift, mirror and/or rotation operations that can be applied to coding blocks in a partitioned projected video frame. In more generic embodiments, video frame candidates may be generated using any combination of shift, mirror and/or rotation operations applied to coding blocks in a partitioned projected video frame. Due to the circular nature of equirectangular content, when shifting a column of coding blocks to the right, the last column of coding blocks on the right become the first column of coding blocks on the left of the picture.

Thereafter, a conventional RDO process 1106$_1$, may be applied to the thus generated video frame candidates. The RDO process will select the best trade-off between image distortion and coding efficiently, where coding efficiently is the amount of bits that are needed to encode the picture for a certain quality. The output of each RDO block may be saved and a processor 1108 may select a column shift of coding blocks that yields the best trade-off between image distortion and bits needed to encode the frame. For example, in the example of FIG. 11, the RDO results may indicate that a shift of columns of coding blocks to the right as depicted in partitioned video frame 1164$_3$ results in a projected video frame that is optimized in terms of image distortion and coding efficiency. Therefore, the processor may select this projected video frame as the optimised video frame candidate.

Information about the number the column of coding blocks are shifted to the right or to the left may be stored in the encoder data model as metadata. This information may be later inserted as decoder information in the output bitstream so that a decoder apparatus is capable of reversing the shift operation that was applied during encoding. Hence, in this embodiment, the video frame candidates may be generated on the basis of simple shifts of coding blocks in a partitioned video encoder. The encoder apparatus does not need to have a module that implements spherical content projection to generate rotations of the content.

As an example of the increased coding performance of the proposed method, table 1 provides measurement results for a video with resolution 1920×1080 pixels.

TABLE 1 measurement results for four encoder settings.

| Encoder setting | Reference | | | | Test signal | | | |
|---|---|---|---|---|---|---|---|---|
| | kbps | Y psnr | U psnr | V psnr | kbps | Y psnr | U psnr | V psnr |
| 22 | 3547 | 48.6 | 51.4 | 51.3 | 3547 | 48.6 | 51.4 | 51.3 |
| 27 | 1327 | 45.7 | 49.6 | 49.3 | 1327 | 45.7 | 49.6 | 49.3 |
| 32 | 607 | 42.9 | 48.1 | 47.7 | 607 | 42.9 | 48.1 | 47.7 |
| 37 | 312 | 40.1 | 46.9 | 46.6 | 312 | 40.1 | 46.9 | 46.6 |

The reference video signal comprises equirectangular projected video frames representing content that is similar to the input frame 1102 of FIG. 11, i.e. a projected video frame in which pixels representing an object, in this case a moving person, is split in two due to the region boundary associated with the equirectangular projection. The test video signal comprises modified projected video frames, with a constant horizontal pixel shift (translation) of e.g. 15 columns of coding blocks of 64×64 pixels (taking into account a padding operation of the encoder extending the video frame to 1920×1088 pixels so that it can be partitioned in an integer number of coding blocks). The optimized video frame candidate represents content that is similar to the output frame 1110 of FIG. 11, i.e. a partitioned projected video frame in which pixels representing the object are positioned approximately in the middle of the video frame.

Measurement results were generated for four different encoder settings, where the encoder quality parameter is varied. The measurement results consist of four bitrate values, expressed in kilobits per second (kbps), and four Peak Signal-to-Noise ratio (PSNR) values for each of the three components of the YUV colour space, i.e. one luma component (Y) and two chrominance components U and V. Based on these measurements results, the coding performance was computed by averaging over the four encoder settings and expressed in rate-distortion cost percentage. The result of this computation is provided in table 2:

TABLE 2 measurement results for four encoder settings.
Encoder performance (R, D)

| Y | U | V |
|---|---|---|
| −2.5% | −5.5% | −3.2% |

Here, values indicate a lower cost and thus better encoding performance over all colour space components, ranging from −2.5% to −5.5%. The experimental data show that the encoding performance in terms of R-D cost can be optimized by reordering (e.g. shifting, mirroring and/or rotating) one or more coding blocks in a projected video frame. The invention thus uses the RDO process in order to determine projected video frames that are optimized in terms of encoding efficiency and bitrate distortion. In other embodiment, coding blocks may be rearranged in accordance with a scheme that does not reflect an actual rotation of the spherical content.

Figure 12:
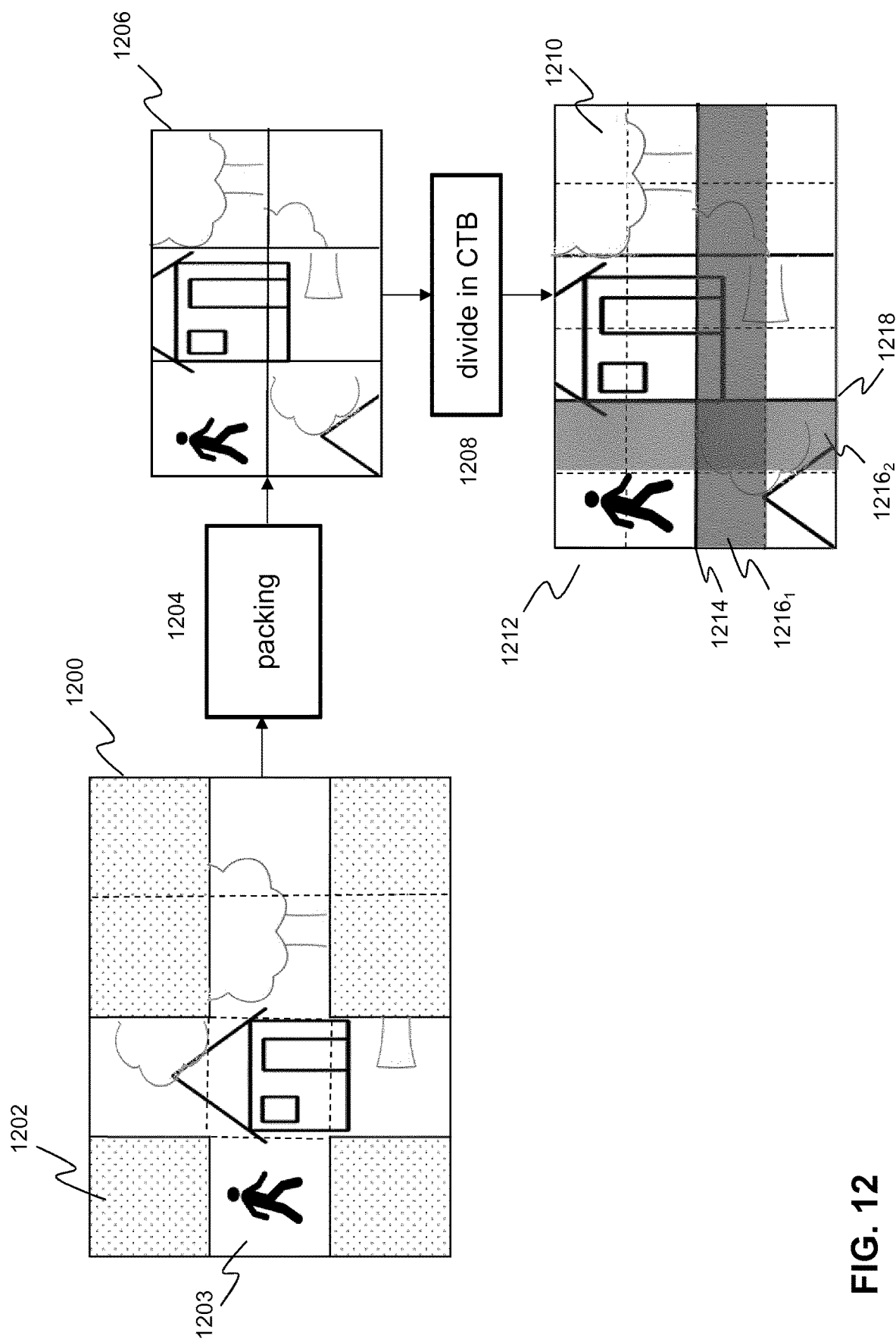
FIG. 12 depicts another example of the partitioning of a projected video frame into coding blocks.

FIG. 12 depicts another example of the partitioning of a projected video frame 1202 into coding blocks. In particular, FIG. 12 depicts the partitioning of a projected video frame resulting in a partitioned projected video frame comprising coding blocks, for example HEVC-type CTBs. In this example, the spherical content is projected onto the video frame using a cubic projection. A projected video frame 1200 comprising pixel regions 1203 which are the result of the projection of spherical video data onto the faces of a cube, which is subsequently mapped onto a 2D rectangular plane as described with reference to FIG. 3 above. In addition to the pixel regions, the projected video frame may include one or more areas (or regions) of pixels that do not contain data from the scene. The projected video frame may be further resized by a packing operation 1204 resulting in a packed video frame 1206 comprising pixel regions wherein the edges of the pixel regions form region boundaries and wherein areas (of regions) 1202 that do not comprise content are eliminated. The packed video frame may be regarded as a (second) projected video frame that is a more compact version of the original (first) projected video frame.

The packed video frame 1206 may be subjected to a partitioning algorithm 1208 in order to partition the packed projected video frame in coding blocks 1210 of a predetermined size thereby forming a partitioned packed video frame 1212. As shown in FIG. 12, in an embodiment, the encoder may be configured such that an integer number of coding blocks fits into a pixel region. This way, one or more boundaries of columns and/or rows of coding blocks may coincide with one or more boundaries of the pixel regions (forming the region boundaries). For example, the upper boundary of a horizontal row of coding blocks $1216_1$ may coincide with a horizontal region boundary 1214. Similarly, a side boundary (in this case the right side) of a column of coding blocks $1216_2$ may coincide with a vertical region boundary 1218.

Figure 13:
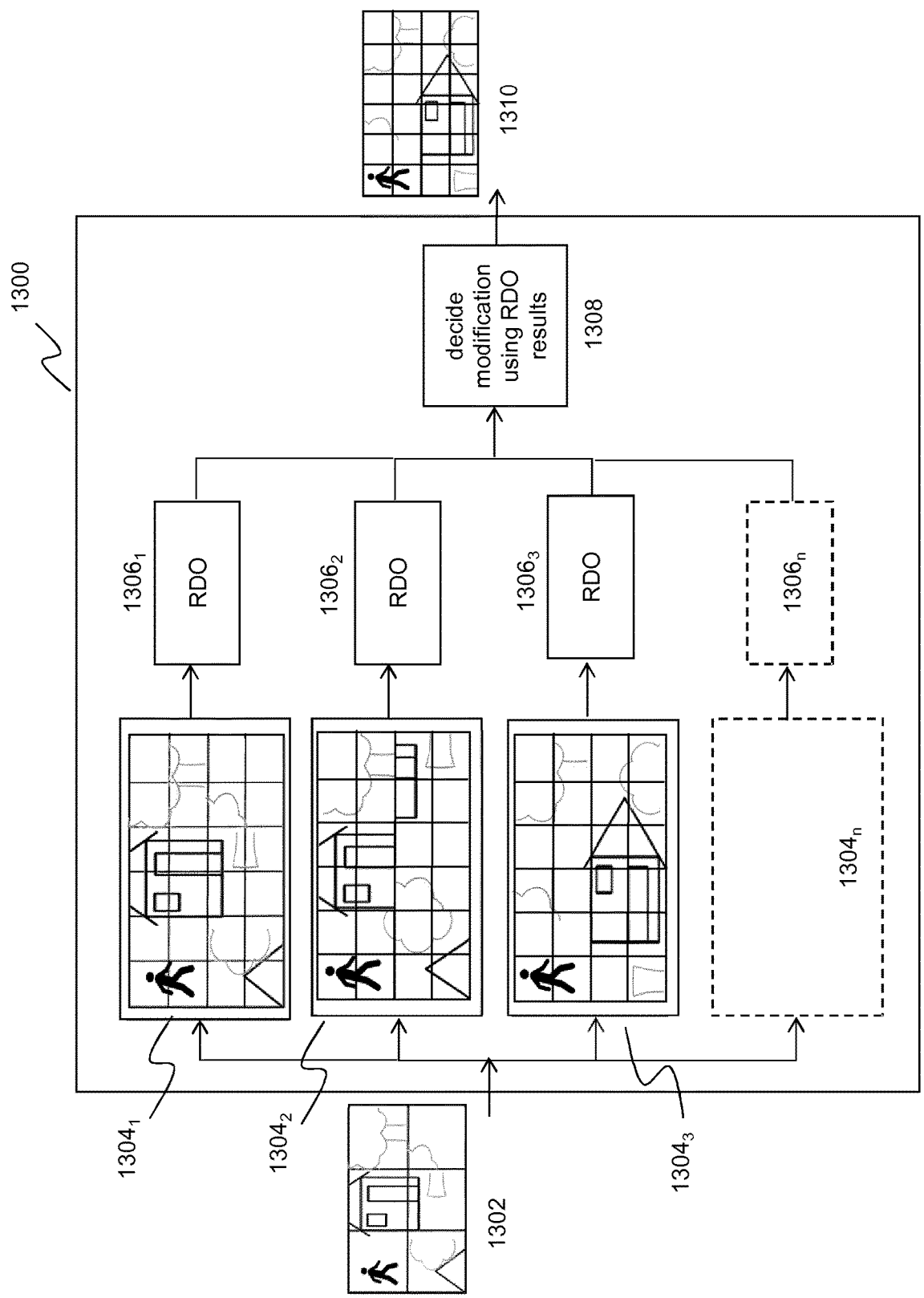
FIG. 13 shows an example of part of an encoding optimization process for spherical video data according to an embodiment of the invention.

FIG. 13 shows an example of part of an encoding optimization process for spherical video data according to another embodiment of the invention. The process may be executed by the encoder apparatus as described with reference to FIG. 7. In particular, FIG. 13 depicts an example of an encoding optimization process wherein different candidate versions $1304_{1-n}$ of a partitioned (cubic) projected video frame are generated by the encoder apparatus and subsequently subjected to an RDO algorithm $1306_{1-n}$. In this embodiment, the video frame candidates may be generated by shifting and/or rotating coding blocks of partitioned projected video frames of luma and chromas components. To that end, the encoder apparatus may partition an input picture 1302, a projected video frame, in coding blocks of a predetermined size resulting in a partitioned projected video frame $1304_1$. An example of such partitioning process is described with reference to FIG. 13. Further, a number of video frame candidates $1304_{1-n}$ may be created on the basis of the partitioned projected video frame by shifting and/or rotating coding blocks or groups of coding blocks.

It is noted that the shift, mirror and/or rotation operations depicted in FIG. 13 are only an example of a large number of possible shift, mirror and/or rotation operations that can be applied to the coding blocks in a partitioned projected video frame. In more generic embodiments, video frame candidates may be generated using any combination of shift, mirror and/or rotation operations applied to coding blocks in a partitioned projected video frame.

Thereafter, an RDO process $1306_{1-n}$ may be applied to the thus generated video frame candidates. The RDO process is configured to select the best trade-off between image distortion and coding efficiently, i.e. the amount of bits that are needed to encode the picture. The output of each RDO block may be saved and a processor 1308 may select a particular shift and/or rotation operation of coding blocks that yields the best trade-off between image distortion and bits needed to encode the frame.

Figure 14:
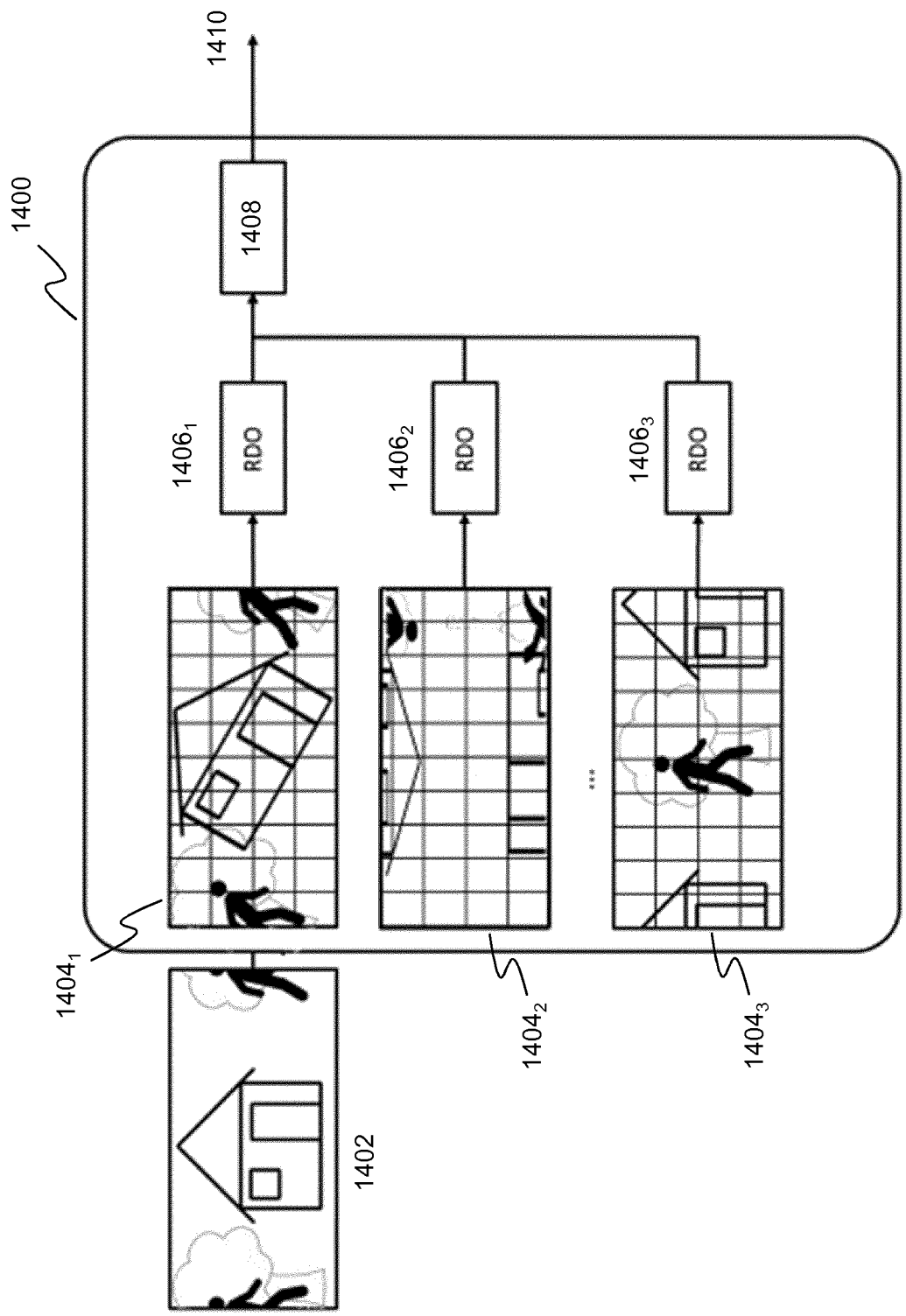
FIG. 14 shows an example of part of an encoding optimization process for spherical video data according to yet an embodiment of the invention.

FIG. 14 shows an example of part of an encoding optimization process for spherical video data according to an embodiment of the invention. The process may be executed by the encoder apparatus as described with reference to FIG. 7. In particular, FIG. 14 depicts an example of an encoding optimization process wherein different candidate versions $1404_{1-n}$ of a partitioned (equirectangular) projected video frame are generated by the encoder apparatus and subsequently subjected to an RDO algorithm $1406_{1-n}$. In this embodiment, the video frame candidates may be generated by applying an arbitrary content sphere rotation. The several candidate frames are generated based on the rotation of the content sphere of different angle values such that several rotations of the sphere constitute the candidate frames.

Hence, in this embodiment, the encoder apparatus is aware of the projection model that was used to project the spherical video data onto a rectangular 2D plane. In particular, in this embodiment the encoder may be configured to:

receive a projected video frame;
reconstruct the spherical video data (i.e. video data on a sphere) on the basis of the projection model that was used to generate the projected video frame;
rotate the sphere on the basis of a predetermined rotation vector;
generate a modified projected video frame on the basis of rotated spherical video data by projecting the rotated spherical video data back on a 2D rectangular area.

This way, different candidate frames may be generated on the basis of different rotation vectors. Similarly, during the decoder process the decoder may be configured to reverse the rotation that was applied to the spherical video data by:

decoding the bitstream, the decoded bitstream including projected video frames representing spherical video data;
extracting decoder information from the decoded bitstream, the decoder information including information associated with a rotation, preferably the rotation being defined by a rotation vector, for reversing the rotation operation that was applied to the spherical video data during encoding;
applying a rotation operation to the spherical video data that reverses the rotation operation that was applied to the spherical video data during encoding.

This way the original projected video frame can be generated on the basis of the rotated spherical video data.

In a further embodiment, the encoder apparatus and decoder apparatus may be projection aware and the projection applied to the original video frame to generate the candidate frames is not aligned on the level of coding blocks but rather at pixel level. For instance, a boundary shift may be applied to one pixel column of an equirectangular projected video frame.

In case the encoder and decoder are projection aware, any type of sphere rotation may be selected for generating candidate frames, thus providing an almost infinite number of possibilities. Hence, in these embodiments, predetermined selection criteria may be used in order to generate candidate frames in order to keep the number of candidate frames manageable. To this end, a content analysis algorithm may be used to estimate the most promising sphere rotations in terms of coding efficiency.

A suitable image analysis of the candidate frames may be used to determine an image analysis parameter for spherical video data which is expected to correlate with an improved coding efficiency. An image analysis parameter for each modified projected video frame may be determined and the modified projected video frame that has a maximum (or minimum) value may be selected for input to the encoder. The modified projected video frame associated with this selected value may be referred to as the optimized projected video frame.

State-of-the-art video analysis techniques may be employed for determining an image analysis parameter that correlates with encoding efficiency. These image analysis techniques include but are not limited to edge detection, entropy or saliency analysis, motion and object analysis, colour shift analysis, and combinations thereof.

In one embodiment, the content analysis may be applied to the spherical video data may include the use of a movement heat map, saliency map, or a map with detected edges. Such content analysis may be applied directly to the spherical video data. For example, Bogdanova et. al. describe in their article with title "*Dynamic attentive system for omnidirectional video*" an algorithm for determining "spots of attention" in omnidirectional video on a sphere using a spherical saliency map. The content of this article is incorporated by reference into this disclosure.

Such content analysis method may be used to determine one or more regions of interest (referred to as "spots of attention") in the spherical video data. These regions of interest may be located on the sphere using spherical coordinates. Thereafter, a number of rotation vectors may be determined that define candidate video frames (i.e. projected video frames) for which the number of regions of interest that is divided by projection boundaries is minimized. Any other optimisation (maximastion or minimisation) of a certain criteria may be used, e.g. minimisation of apparent movement in the video.

Figure 15C:
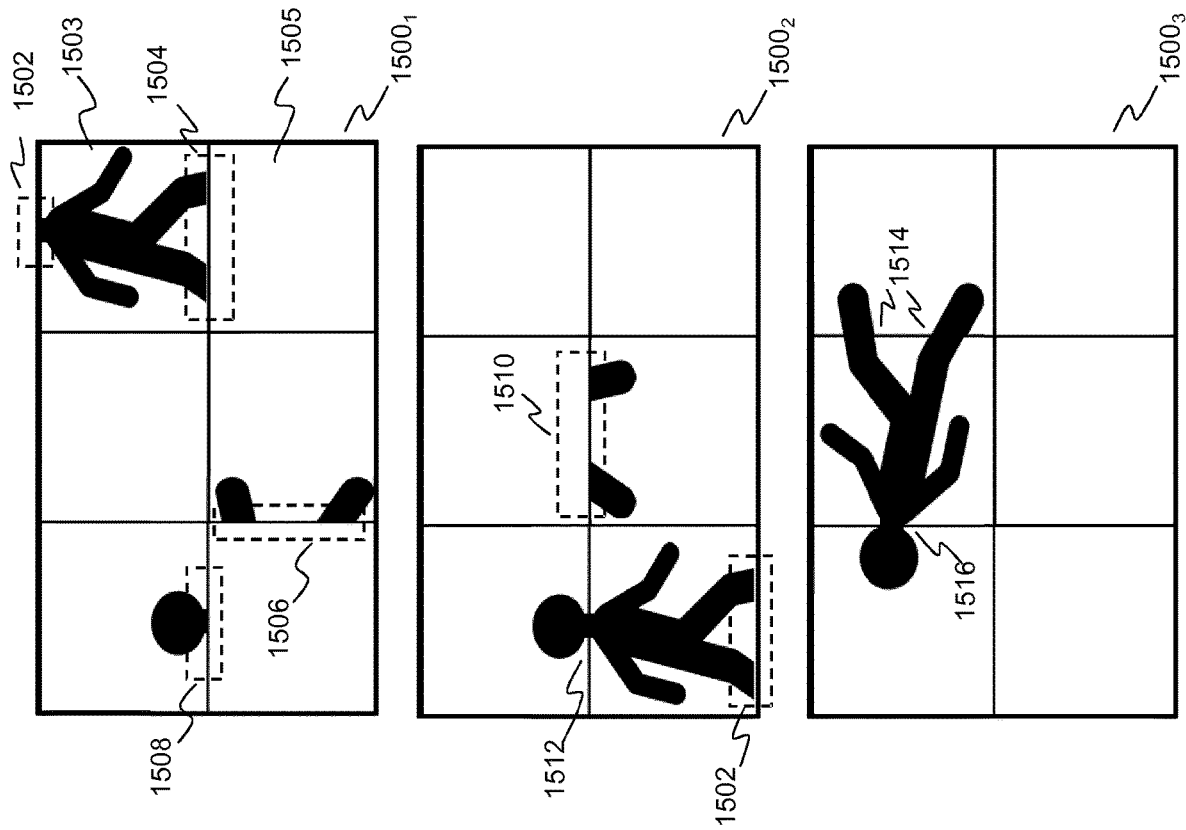

FIG. 15A-15C depict examples of image analysis for projected video frames according to yet another embodiment of the invention. In this embodiment, an image analysis may be performed on the projected video frames. For example, FIGS. 15A and 15B illustrate an example of a global image analysis for determining a global image analysis parameter which correlates or which is expected to correlate with the coding efficiency and/or visual quality of the decoded content of a projected video frame. In such global image analysis technique the projection boundaries are not taken into account and a parameter value is determined on the basis of the pixel configuration of the projected video frame as a whole.

FIGS. 15A and 15B depicts a global contrast-based saliency map for identifying salient regions in modified projected video frames. In these figures areas of high saliency are indicated as white. The variance of the position of the white pixels may provide a measure for how compact the high saliency region is and thus may be used as a criterion to minimize the chance of region boundaries splitting the interesting objects in the scene. Hence, depending on the pixel shift, pixel region translation and/or rotations that is introduced in a projected video frame, the amount of high saliency areas may increase or decrease. Hence, this parameter may be used to determine a modified projected video frame, a candidate video frame, that has a minimal amount of areas of high saliency.

Modified projected video frames for which the global image processing parameter, e.g. the amount of high saliency areas, is minimal may be used as candidate vide frames. As for these video frames it expected that the amount of high saliency areas in a video frame correlates with the coding efficiency (a large amount of areas of high saliency decreases the coding efficiency). The thus determined candidate video frames may be used as input to an encoding optimization process for spherical video data as described with reference to FIG. 9.

FIG. 15C illustrates an example of a local image analysis for determining a local image analysis parameter which correlates with coding efficiency and/or visual quality of the decoded content of a projected video frame. In such local image analysis technique the projection boundaries are analysed locally. For example, in FIG. 15C three different modified projected video frames $1500_{1-3}$ are depicted. An image analysis algorithm may be used that generates a parameter that provides a measure for the amount of object discontinuities at the region boundaries. To that end, the image analysis algorithm may locally examine pixels at the boundaries of pixel regions. For example, in the first modified projected video frame state-of-the-art image analysis techniques may be used to determine areas along the boundaries of the pixel region that exhibit sharp discontinuities. For example, the image analysis algorithm may determine three in-frame boundary areas 1504,1506,1508 which exhibit sharp pixel discontinuities that coincide with the pixel boundaries. For example, boundary area 1504 exhibit two locations along the region boundary that comprise a sharp artificial discontinuity that aligns with the region boundary between pixel region 1503 and pixel region 1505. Similarly, the image analysis algorithm may determine sharp pixel discontinuities 1502 that coincide with the pixel boundaries that are part of the boundary (the edge) of the projected video frame.

The image analysis algorithm may determine a local image analysis parameter that provides a measure of the amount of pixel discontinuities at the region borders, especially pixel discontinuities at the region borders that relate to moving object and/or highly textured objects. Such analysis may be repeated for different modified projected vide frames. As shown in FIG. 15C other arrangements of pixel regions may comprise less pixel discontinuities at the region boundaries. For example, projected video frame $1500_2$ may comprise two areas comprising a sharp artificial discontinuity that aligns with the region boundary and projected video frame $1500_3$ may comprise no areas along the region boundaries comprising a sharp artificial discontinuity.

Modified projected video frames for which the local image processing parameter, e.g. the amount of pixel discontinuities at the region borders, is minimal may be selected as the candidate video frames, as it expected that the amount of discontinuities at the region borders in a video frame correlates with the coding efficiency (a large amount of areas of discontinuities decreases the coding efficiency).

The thus determined candidate video frames may be used as input to an encoding optimization process for spherical video data as described with reference to FIG. 9.

The embodiments described with reference to FIG. 7-14 provide the advantages that the decision for a given encoding of a coding block can be reused for the next frame candidate for the CTB containing the same content provided the context (for instance surrounding of the CTB) is the same. Indeed, the encoding process in current video coding standard is deterministic, that is the same input provides the same output. Thus, the same content with the same context must lead to the same decision in terms of prediction mode, quantisation step adaptation, etc.

Embodiments described with reference to FIGS. 10 and 11 consider rotations of the content may match with an integer number of coding blocks. For example, in an equirectangular projection, allowed rotations of the spherical data may be angle that is equal to: 360 degrees divided by the number of coding blocks on a row along the pole axis of the projected video frame.

The embodiments described in this disclosure may be implemented as an extension of an existing coding standard such as the AVC standard, the HEVC standards or a coding standard derived from the AVC or HEVC standard. The AVC standard and the current HEVC video coding standard, ISO/IEC 23008-2, use a Network Abstraction Layer (NAL) for defining data formats at bitstream level. The NAL may comprise Video Coding Layer NAL units and non-VCL NAL units wherein VCL NAL units may be regarded as a collective term for NAL units that contain video samples such as encoded video frames (or are considered as such by the HEVC standard) and wherein non-VCL NAL units may be used for signalling properties and characteristics of VCL NAL units. Furthermore the invention may as well be implemented as extensions of other block based video coding standards such as VP9 and AV1.

Figure 16:
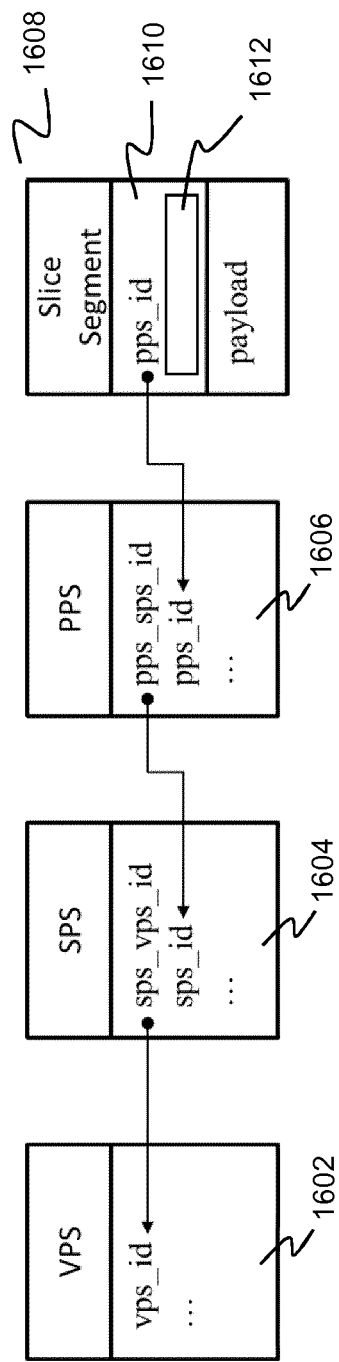
FIG. 16 depicts the relationship between the NAL units as used in state of the art codecs

FIG. 16 depicts the insertion of decoder information according to an embodiment of the invention. In particular, FIG. 16 depicts the relationship between the NAL units as used in state of the art codecs, for example codecs known from the AVC and HEVC standards, wherein decoder information is inserted in at least one of the NAL units. Non-VCL NAL units include the metadata associated with the video data. These non-VCL NAL units include the Picture Parameter Set (PPS) 1606, Sequence Parameter Set 1604 (SPS) and Video Parameter Set 1602 (VPS) where one PPS refers to one SPS which in turns refers to one VPS. The video data are contained in an VCL NAL unit which is referred to as a slice segment 1608. The video data in the slice segment may decoded on the basis of the information in the PPS, SPS and VPS it refers to.

The decoder information, including the information on the pixel shift, mirror and/or rotation operations applied to pixels, preferably pixels in coding blocks, in partitioned projected video frames during the encoding process may be formatted as part of a NAL unit, preferably in the header of a VCL NAL unit.

For example, in an embodiment, the spherical video data may be provided to an encoder apparatus in the form of video frames comprising equirectangular projected spherical video data. During encoding an optimized video frame candidate may be selected from a number of video frame candidates using an RDO algorithm as discussed with reference to FIG. 7-15 above. A plurality of modified projected video frames (i.e. candidate video frames) may be generated by horizontally shifting pixels in a partitioned equirectangular projected video frame an integer number of coding blocks, e.g. HEVC-type CTBs or AVC type of macroblocks, to the left or right in the video frame as described with reference to FIG. 10.

In an embodiment, decoder information 1612 including one or more shift, mirror and/or rotation operations of one or more groups of pixels in a projected video frame may be signalled to the decoder apparatus in a NAL unit, preferably in the header of a VCL NAL unit, such as a slice segment header 1512. The slice segment header may comprise the information necessary to reverse a modification of the projected video frame that applies to the whole frame uniformly. The signalled coding block shift may be applied to the right or to the left. Further, the value representing the number of coding block shifts should be less than the number of coding blocks in a row of a partitioned projected video frame. An example of a syntax of such slice segment header is provided in table 3:

TABLE 3

| example of a slice segment header | |
|---|---|
| | Descriptor |
| slice_segment_header( ) {<br>...<br>  pixel_shift_in_ctb_size<br>...<br>  byte_alignment( )<br>} | ue(v) |

In a further embodiment, the number of coding block shifts may be signalled in a slice segment header extension as defined in the HEVC standard. The HEVC standard defines an extension in the slice segment header called slice_segment_header_extension_data_byte which allows storing a value.

Instead of signalling metadata at the bitstream level, e.g. a NAL unit, a Supplemental Enhancement Information (SEI) message to signal the number of coding block shifts. An example of such SEI message is provided in table 4:

TABLE 4

| example of a SEI message | |
|---|---|
| | Descriptor |
| ctb_shift(payloadSize ) {<br>  pixel_shift_in_ctb_size<br>} | ue(v) |

Here, the attribute pixel_shift_in_ctb_size may signal a decoder apparatus about the horizontal shift in coding block, e.g. CTB size, to be applied to the pixel to recover the original pixel arrangement in the frame.

Figure 17:
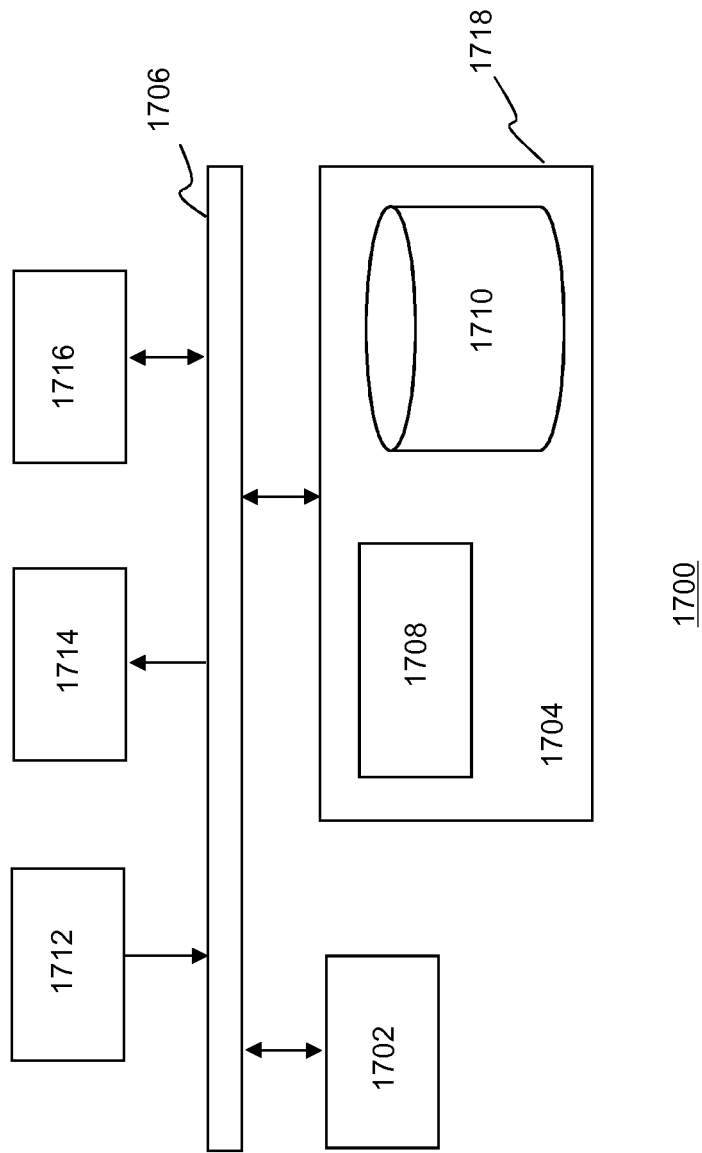
FIG. 17 depicts a block diagram illustrating an exemplary data processing system that may be used with embodiments described in this disclosure.

FIG. 17 is a block diagram illustrating an exemplary data processing system that may be used in as described in this disclosure. Data processing system 1700 may include at least one processor 1702 coupled to memory elements 1704 through a system bus 1506. As such, the data processing system may store program code within memory elements 1704. Further, processor 1702 may execute the program code accessed from memory elements 1704 via system bus 1706. In one aspect, data processing system may be implemented as a computer that is suitable for storing and/or executing program code. It should be appreciated, however, that data processing system 1700 may be implemented in the form of any system including a processor and memory that is capable of performing the functions described within this specification.

Memory elements 1704 may include one or more physical memory devices such as, for example, local memory 1708 and one or more bulk storage devices 1710. Local memory may refer to random access memory or other non-persistent memory device(s) generally used during actual execution of the program code. A bulk storage device may be implemented as a hard drive or other persistent data storage device. The processing system 1700 may also include one or more cache memories (not shown) that provide temporary storage of at least some program code in order to reduce the number of times program code must be retrieved from bulk storage device 1710 during execution.

Input/output (I/O) devices depicted as input device 1712 and output device 1714 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1716 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1750.

As pictured in FIG. 17, memory elements 1704 may store an application 1718. It should be appreciated that data processing system 1700 may further execute an operating system (not shown) that can facilitate execution of the application. Application, being implemented in the form of executable program code, can be executed by data processing system 1700, e.g., by processor 1702. Responsive to executing application, data processing system may be configured to perform one or more operations to be described herein in further detail.

In one aspect, for example, data processing system 1700 may represent a client data processing system. In that case, application 1718 may represent a client application that, when executed, configures data processing system 1700 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1718, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of forming a bitstream by an encoder apparatus, the method comprising:
   a processor of the encoder apparatus receiving a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;
   subsequently the processor generating a plurality of different candidate video frames on a basis of the projected video frame, each candidate video frame being generated by applying one or more pixel operations to pixels of the projected video frame, a pixel operation being defined as applying at least one of a shift, mirror, or rotation operation to one or more groups of pixels, at least one of the one or more pixel operations being different each time one of the plurality of different candidate video frames is being generated;
   the processor applying a rate distortion analysis to each of the candidate video frames to determine a rate distortion cost for each of the candidate video frames;
   the processor selecting a candidate video frame from the plurality of candidate video frames on the basis of the rate distortion cost; and
   generating an output bitstream on a basis of the selected candidate video frame.

2. The method according to claim 1, wherein each of the one or more groups of pixels defines pixels within one of the one or more pixel regions.

3. The method according to claim 1, wherein each of the one or more groups of pixels defines one or more coding blocks within one of the one or more pixel regions, a coding block representing the largest block of pixels that the processor can handle.

4. The method according to claim 1, wherein the generation of the plurality of candidate video frames is further based on metadata associated with the received projected video frame, the metadata including information about at least one of: the projection model, the size of the one or more pixel regions, the location of the one or more pixel regions in the projected video frame, or the geometry of the one or more pixel regions.

5. The method according to claim 1, wherein the generating of the output bitstream includes:

determining decoder information, the decoder information including information for enabling a decoder apparatus to reverse the one or more pixel operations applied to generate the selected candidate video frame; and coding the selected candidate frame and the decoder information, in a sequence of bits.

6. The method according to claim 5 wherein at least part of the decoder information is inserted as at least one of: one or more SEI messages, or one or more network abstraction layer (NAL) units in the bitstream.

7. The method according to claim 1, wherein the generation of the plurality of candidate video frames is further based on the video content in the projected video frame the one or more image analysis parameters being determined on the basis of at least one of: an entropy analysis, a saliency analysis, a colour shift analysis, a motion magnitude and/or a motion direction analysis, an object analysis, a colour shift analysis, a boundary analysis, or an edge detection analysis.

8. The method according to claim 1, wherein generating a plurality of different candidate video frames includes:
reconstructing spherical video data on a basis of the received projected video frame;
selecting a plurality of rotations on a basis of an image analysis algorithm; and
generating the plurality of different candidate video frames by rotating the spherical video data on the basis of a rotation vector and projecting the rotated spherical video data onto a 2D rectangular plane.

9. The method according to claim 1, wherein during the rate distortion analysis of the candidate video frames at least part of the information associated with a rate distortion analysis of a first candidate video frame of the plurality of video frames is used in the rate distortion analysis of a second candidate video frame of the plurality of video frames, the information being associated with one or more pixel arrangements of the first candidate video frame that are similar to one or more respective pixel arrangements of the second candidate video frame.

10. A method of forming a video signal by a decoder apparatus, the method comprising:
a processor of the decoder apparatus receiving a bitstream comprising projected video frames, a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;
the processor receiving decoder information associated with the encoded projected video frame, the decoder information including information for reversing one or more pixel operations that were applied during encoding to one or more groups of pixels of the projected video frame, a group of pixels defining a pixel region and/or one or more coding blocks, a pixel operation being defined as applying at least one of a shift, mirror, or rotation operation to one or more groups of pixels; and
the processor forming a video signal on a basis of the bitstream, the forming of the video signal including decoding encoded projected video frames in the bitstream and using the decoder information to reverse the at least one pixel operation, the video signal being arranged for being rendered on a display.

11. The method according to claim 10 wherein decoder information is contained in at least one of: one or more SEI messages in the bitstream, or one or more network abstraction layer (NAL) units in the bitstream.

12. An encoding apparatus comprising:
a processor; and
a computer readable storage medium having computer readable program code stored therein that, when executed by the processor, causes the encoding apparatus to carry out operations including:
receiving a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;
generating a plurality of different candidate video frames on a basis of the received projected video frame, each candidate video frame being generated by applying one or more pixel operations to pixels of the projected video frame, a pixel operation being defined as applying at least one of a shift, mirror, or rotation operation to one or more groups of pixels, at least one of the one or more pixel operations being different each time one of the plurality of different candidate video frames is being generated;
applying a rate distortion analysis to each of the candidate video frames to determine a rate distortion cost for each of the candidate video frames;
selecting a candidate video frame from said plurality of candidate video frames on the basis of the rate distortion cost; and
generating an output bitstream on a basis of the selected candidate video frame.

13. A decoding device comprising:
a processor; and
a computer readable storage medium having computer readable program code stored therein that, when executed by the processor, causes the decoding device to carry out operations including:
receiving a bitstream comprising projected video frames, a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;
receiving decoder information associated with the encoded projected video frame, the decoder information including information for reversing one or more pixel operations that were applied during encoding to one or more groups of pixels of the projected video frame, a group of pixels defining a pixel region and/or one or more coding blocks, a pixel operation being defined as applying at least one of a shift, mirror, or rotation operation to one or more groups of pixels; and
forming a video signal on the basis of a bitstream, the forming of the video signal including decoding encoded projected video frames in the bitstream and using the decoder information to reverse the at least one pixel operation.

14. The decoding device according to claim 13, wherein the decoder information is contained in at least one of: one or more SEI messages in the bitstream, or one or more network abstraction layer (NAL) units in the bitstream.

15. A non-transitory computer-readable medium having instructions stored thereon that, when executed by a processor of an encoding apparatus, cause the encoding apparatus to carry out operations including:

receiving a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;

generating a plurality of different candidate video frames on a basis of the received projected video frame, each candidate video frame being generated by applying one or more pixel operations to pixels of the projected video frame, a pixel operation being defined as applying at least one of a shift, mirror, or rotation operation to one or more groups of pixels, at least one of the one or more pixel operations being different each time one of the plurality of different candidate video frames is being generated;

applying a rate distortion analysis to each of the candidate video frames to determine a rate distortion cost for each of the candidate video frames;

selecting a candidate video frame from said plurality of candidate video frames on the basis of the rate distortion cost; and generating an output bitstream on a basis of the selected candidate video frame.

16. A non-transitory computer-readable medium having instructions stored thereon that, when executed by a processor of an encoding apparatus, cause the encoding apparatus to carry out operations including:

receiving a bitstream comprising projected video frames, a projected video frame having a pixel area which includes one or more pixel regions, the one or more pixel regions having pixels representing spherical video data projected onto one or more 2D projection surfaces of a projection model, and the one or more 2D projection surfaces being mapped to the one or more pixel regions;

receiving decoder information associated with the encoded projected video frame, the decoder information including information for reversing one or more pixel operations that were applied during encoding to one or more groups of pixels of the projected video frame, a group of pixels defining a pixel region and/or one or more coding blocks, a pixel operation being defined as applying at least one of a shift, mirror, or rotation operation to one or more groups of pixels; and forming a video signal on the basis of a bitstream, the forming of the video signal including decoding encoded projected video frames in the bitstream and using the decoder information to reverse the at least one pixel operation.

17. The method according to claim 1, wherein the projection model is a 3D projection model.

18. The method according to claim 1, wherein at least one pixel region comprises an integer number of coding blocks.

19. The method according to claim 3, wherein the coding block is one of an HEVC-type coding tree block (CTB), an AVC-type macroblock, a VP9, or AV1 superblock.

20. The method according to claim 10, wherein the projection model is a 3D projection model.

* * * * *